United States Patent
Koutsimanis et al.

(10) Patent No.: US 9,037,174 B2
(45) Date of Patent: May 19, 2015

(54) METHOD AND ARRANGEMENT FOR IMPROVING RADIO NETWORK CHARACTERISTICS

(75) Inventors: Chrysostomos Koutsimanis, Solna (SE); Bo Hagerman, Tyresö (SE); Per Skillermark, Årsta (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 437 days.

(21) Appl. No.: 13/392,941

(22) PCT Filed: Sep. 2, 2009

(86) PCT No.: PCT/SE2009/050992
§ 371 (c)(1),
(2), (4) Date: Feb. 28, 2012

(87) PCT Pub. No.: WO2011/028158
PCT Pub. Date: Mar. 10, 2011

(65) Prior Publication Data
US 2012/0165064 A1 Jun. 28, 2012

(51) Int. Cl.
*H04W 40/00* (2009.01)
*H04B 7/00* (2006.01)
(Continued)

(52) U.S. Cl.
CPC .......... *H04W 4/08* (2013.01); *H04B 7/024* (2013.01); *H04W 8/186* (2013.01); *H04W 88/08* (2013.01)

(58) Field of Classification Search
CPC .................................................. H04W 28/08
USPC .................. 455/436, 444, 439, 453
See application file for complete search history.

(56) References Cited

U.S. PATENT DOCUMENTS

2006/0121906 A1* 6/2006 Stephens et al. ............. 455/446
2007/0225029 A1* 9/2007 Abusch-Magder ........... 455/525

FOREIGN PATENT DOCUMENTS

CN 101389115 A 3/2009
GB 2 332 600 A 6/1999
(Continued)

OTHER PUBLICATIONS

International Search Report issued in corresponding International Application No. PCT/SE2009/050992, mailed Jun. 18, 2010.
(Continued)

*Primary Examiner* — Tilahun B Gesesse
(74) *Attorney, Agent, or Firm* — Patent Portfolio Builders PLLC

(57) ABSTRACT

The present invention discloses a method in a network node (310, 610) for improving radio network characteristics in a wireless communications network (300, 600) comprising M cells. The method forms at least a first subgroup SC of cells comprising K cells, where K<=M, for coordinated transmission and/or reception between the cells. The network node (310, 610) determines (410, 730) at least one weight $a_{ij}$ associated with a first cell $C_i$ and a second cell $C_j$ in the network. The weight $a_{ij}$ indicates a radio network characteristic dependent on the cells $C_i$ and $C_j$. The network node (310, 610) forms (470) the subgroup SC of cells by selecting at most K cells from the M cells, in such a way that a function of the weights $a_{ij}$ for each cell $C_i$ and $C_j$ in the subgroup SC is approximately maximized. The network node (310, 610) sends (480) a message to each cell $C_k$ in the subgroup SC, relating said cell $C_k$ to said subgroup SC.

43 Claims, 11 Drawing Sheets

(51) Int. Cl.
  *H04W 4/08* (2009.01)
  *H04B 7/02* (2006.01)
  *H04W 8/18* (2009.01)
  *H04W 88/08* (2009.01)

(56) References Cited

FOREIGN PATENT DOCUMENTS

| GB | 2332600 A | * | 6/1999 | ............... H04Q 7/36 |
| GB | 2 382 503 A | | 5/2003 | |

OTHER PUBLICATIONS

3GPP TSG RAN WG1 Meeting #56b, R1-091189, Seoul, Korea, Mar. 23-27, 2009, Source: LG Electronics, "Cell Clustering and Feedback for CoMP" [retrieved from the internet Apr. 4, 2010 URL: http://www.3gpp.org/ftp/tsg_ran/WG1_RL1/TSGR1_56b/Docs/R1-091189.zip]; whole document; abstract.

3GPP TSG RAN WG1 Meeting #56, R1-090657, Athens, Greece, Feb. 9-13, 2009, Source: LG Electronics, "Dynamic Cell Clustering for CoMP" [retrieved from the internet Apr. 28, 2010 URL: http://www.3gpp.org/ftp/tsg_ran/WG1_RL1/TSGR1_56/Docs/R1-090657.zip]; whole document; abstract.

Patrick Marsch et al.: "On Multicell Cooperative Transmission in Backhaul-Constrained Cellular Systems" [online], Ann. Tellecommun. (2008) 63:253-269, DOI 10.1007/S12243-008-0028-3; Published online: May 1, 2008, [retrieved from internet Apr. 28, 2010 URL: http://www.springerlink.com/content/ap8876q02u1n4742/fulltext.pdf], whole document; abstract.

3GPP TSG RAN WG1 Meeting #58, R1-093305, Shenzhen, China, Aug. 24-28, 2009, Source: Nokia Siemens Networks, "CoMP Cell Set Selection and Performance Evaluation Considerations" [retrieved from the internet Apr. 28, 2010 URL: http://www.3gpp.org/ftp/tsg_ran/WG1_RL1/TSGR1_58/Docs/R1-093305.zip]; whole document; abstract.

A.M.J. Kuurne: "On GSM Mobile Measurement Based Interference Matrix Generation", Vehicular Technology Conference, 2002, VTC Spring 2002, IEEE 55th, vol. 4, abstract and pp. 1965-1967.

* cited by examiner

METHOD AND ARRANGEMENT FOR IMPROVING RADIO NETWORK CHARACTERISTICS

TECHNICAL FIELD

The present invention relates generally to methods and arrangements for improving radio network characteristics in a wireless communications network. In particular, it relates to forming subgroups of cells for coordinated transmission and/or reception.

BACKGROUND

Wireless networks for wide area coverage are typically deployed using multiple geographically separated sites. A site is the physical location where antennas and/or radio communications equipment, e.g. one or more radio base stations, are placed. Each site may comprise several cells, sometimes referred to as sectors. A common scenario is that a base station comprises three antennas facing in different directions, thus creating a three-sector cell. However, a base station may also be connected to one or more remote antennas. Thus, a single base station could serve several cells, which may be geographically distributed. When migrating to newer wireless access technologies, for example updating from a WCDMA (Wideband Code Division Multiple Access) system to LTE (Long Term Evolution), operators will typically aim to reuse as much as possible of the already existing infrastructure in order to reduce costs. In this situation, the location of the new needed sites is more or less predetermined from the locations of the old technology sites.

Furthermore, cells within close proximity of each other are often mutually dependent, in the sense that transmissions in one cell influence ongoing transmissions in neighboring cells by means of inter-cell interference.

Recently, wireless system architectures that allow for coordinated transmission and reception across multiple cells and sites have attracted significant interest. By coordinating the operation of radio base stations that serve mutually dependent cells, it is possible to reduce interference and enhance signal strengths and/or signal quality. One early example of coordinated transmission is soft handover in CDMA (Code Division Multipoint Access) systems, e.g. WCDMA (Wideband CDMA), where downlink transmissions to mobile terminals at the cell border originate from multiple cells. By combining the signals received from the multiple cells, the probability increases that a mobile terminal at the cell border will be able to receive the signal with adequate strength. Similarly, soft handover in the uplink in CDMA is an example of coordinated reception. Uplink soft handover implies that the uplink signal is received at several cells, and later on the information is combined at a central node. Again, by combining signals from several cells, the probability that the signal is correctly received increases.

Nowadays, more advanced and complex forms of coordination across cells are also considered. Some examples are downlink joint coherent processing, and uplink reception across multiple cells and sites using soft values. Different forms of inter-cell interference coordination techniques, like coordinated scheduling and coordinated beam forming, are also of interest. For instance, by using coordinated beam forming, transmission energy from several cells could be directed towards a mobile terminal, thereby improving signal strength. In the present disclosure, the term CoMP, or coordinated multipoint transmission and reception, will be used to refer to all these schemes, as well as other techniques for coordinated transmission/reception.

A group of cells which perform coordinated transmission and/or reception will hereinafter be referred to as a coordination area or a subgroup. Generally speaking, the benefit from using CoMP increases with the size of the coordination area. However, in order to coordinate their operation, all the cells within a coordination area need to exchange information with each other. This information exchange is typically done over a transport network, i.e. a network connecting the radio base stations in the radio access network. For instance, the transport network could use point-to-point microwave connections or fibre optic cables to connect the cells. The need for information exchange between the cells implies that the size of the coordination areas needs to be limited, otherwise the data exchange capabilities in the transport network may be exceeded. Moreover, coordination between a large number of cells will increase computational complexity as well as latency, since the coordination information will need to travel greater distances. Considering that the gains associated with an extended coordination area typically diminish as the size of the coordination area increases, the size of the coordination areas should be chosen to provide a good balance between performance and complexity.

To illustrate the concept of coordination areas, FIG. 1 shows a wireless communications network 100 in the form of an LTE (Long Term Evolution) radio access network, comprising a number of cells 130, 132 . . . 148. Each cell is served by a radio base station; in this particular example an evolved NodeB (eNB). Thus, the eNB that serves a particular cell handles radio communication with mobile terminals that are within the coverage area of the cell. In FIG. 1, cell 136 is served by network node 110, and cell 134 is served by network node 150. As mentioned above, one eNB may serve several cells. For instance, eNB 180 serves both cells 140 and 142 via a remote antenna 190, which is located within cell 142 and connected to eNB 180 using any suitable connection means, such as a fibre optic cable.

For purposes of CoMP transmission and/or reception, some of the cells may form coordination areas. In the present example, cells 134, 140, and 142 form a coordination area 120, as indicated by the thick line in FIG. 1.

Furthermore, some or all of the eNBs within the wireless communications network 100 are connected by means of a transport network. This allows the eNBs to exchange information, e.g. for coordinating transmission or reception of signals in the cells being served by them. In FIG. 1, the transport network comprises the communication links 170 and 1100. It should be noted that it is not required to have a direct link between two eNBs for them to be able to exchange information over the transport network. For instance, eNB 180 is indirectly connected to eNB 110 via eNB 150, and may thus exchange information with eNB 110.

There are basically two approaches to providing the transport connectivity among the eNBs of the system. In the first approach, the eNBs are connected via dedicated links, such as fiber, optical, or microwave connections. In that case, two eNBs can exchange data, i.e. the cells they serve can be part of the same coordination area, only if there is an existing physical connection between the eNBs. In any other case, if it is desired to coordinate the cells served by these eNBs, a new physical connection has to be established. Multi-hop type of connections may also be applicable, as indicated above, but require more advanced methods of coordination and also increase the latency of the transport network. In the second approach, the eNBs are connected via a switched transport network, such as Gigabit Ethernet or Gigabit Passive Optical Network (GPON). In this case, all eNBs are connected to the network by using dedicated links, and two cells can be part of the same group by correctly setting the switches of the transport network corresponding to the serving eNBs. Hence, in this approach the physical connections among the eNBs exist but have to be enabled.

Two general approaches to forming coordination areas can be distinguished:
1. The coordination areas are formed per mobile terminal. In other words, each mobile terminal, e.g. user equipment (UE) is associated with a group of cells, which may or may not have a different composition than the group of cells used by other mobile terminals in the same geographical area. The coordination area for a mobile terminal typically changes dynamically over time. This solution is used e.g. for soft handover in CDMA.
2. The cells in the network are divided into a set of coordination areas according to some algorithm, and this division then applies to all mobile terminals within the network. In principle, the different coordination areas may be partly overlapping, but in a typical and simple case there is no overlap of cells belonging to several coordination areas. A mobile terminal is associated with one of the coordination areas based on its current location, and data transmission and reception to the mobile terminal is handled within this coordination area.

The present disclosure will focus on the second approach, which is considered to be more suited to handle fast and advanced forms of simultaneous transmission to and reception from multiple mobile terminals foreseen to be employed in future networks.

In order to get the most benefit out of the CoMP network, coordination areas should be formed such that cells in the same coordination area have a high degree of mutual dependency, also referred to as coupling, while the coupling between cells belonging to different coordination areas is low. As mentioned above, a high degree of coupling between two cells means that transmissions in one cell strongly influence ongoing transmissions in the other cell. In other words, strong coupling implies high inter-cell interference. The strong coupling may be experienced in either the total cell coverage area or in subsections of the cell coverage area.

In scenarios where deployment, environment, and traffic is homogenous, coordination areas may be formed by grouping cells together based on geographical distance—i.e. cells that are geographically close are included in the same coordination area. In heterogeneous scenarios, however, traffic distribution, cell size, the number of sectors per site, and the physical environment may vary. For instance, large buildings and hills may affect the coupling between cells. In such scenarios, the geographical distance between cells may no longer be an adequate indication of the level of inter-cell interference. For instance, if two geographically adjacent cells are separated by a large building, the level of inter-cell interference between these cells may be very low. Thus, in heterogeneous networks it may no longer be possible to form suitable coordination areas based on the geographical distance between cells only.

If the coordination areas are formed in a less than optimal way, i.e. if the factors discussed above are not appropriately taken into account, the cooperation between the cells within the coordination areas will be less efficient. This may have a negative effect on radio network characteristics such as signal strength, system throughput, or latency.

Thus, there is a need for methods for forming coordination areas in heterogeneous networks, in order to achieve efficient CoMP deployment and improved radio network characteristics.

SUMMARY

An object of the present invention is to alleviate at least some of the problems mentioned above.

A further object according to some embodiments of the invention is to improve radio network characteristics, such as throughput, in a wireless communications network.

Yet another object of some embodiments is to improve utilization of scarce radio resources in a wireless communications network.

According to an embodiment of the present invention, at least some of the objects are achieved by a method in a network node for improving radio network characteristics in a wireless communications network comprising M cells. In a first step, the network node determines at least one weight $a_{ij}$ associated with a first cell $C_i$ and a second cell $C_j$ in the wireless communications network. The weight $a_{ij}$ indicates a radio network characteristic that is dependent on said first cell $C_i$ and said second cell $C_j$. In some variants of this embodiment, the radio network characteristic is the level of mutual interference between the cells. Thus, in these variants, each weight indicates the level of mutual dependency between a pair of cells. In a subsequent step, the network node forms at least a first subgroup SC of cells for coordinated transmission and/or reception, by selecting at most K cells from the M cells, where K<=M. The selection is performed in such a way that a function of the weights $a_{ij}$ for each cell $C_i$ and $C_j$ being in the subgroup SC is approximately maximized. In a variant of this embodiment, the function is the sum of the weights $a_{ij}$ for each cell $C_i$ and $C_j$ being in the subgroup SC. An advantage of approximately maximizing the sum of weights is that in a group of cells with a high sum of weights, it is likely that many of the cells have strong mutual dependencies, making them good candidates for inclusion in the same coordination area. When the subgroup SC has been formed, the network node sends a message to each cell $C_k$ in the subgroup SC comprising data relating said cell $C_k$ to said subgroup SC. Thus, the members of the subgroup are informed of which other cells are part of the same group.

According to a further embodiment of the present invention, at least some of the objects are achieved by an arrangement for a network node for improving radio network characteristics in a wireless communications network comprising M cells. The arrangement is configured to form at least a first subgroup SC of cells comprising K cells, where K<=M, for coordinated transmission and/or reception between the cells in said subgroup SC in said wireless communications network. The arrangement comprises a weight determination unit, which is configured to determine at least one weight $a_{ij}$ associated with a first cell $C_i$ and a second cell $C_j$ in the wireless communications network. The weight $a_{ij}$ indicates a radio network characteristic that is dependent on said first cell $C_i$ and said second cell $C_j$. The arrangement further comprises a subgroup formation unit, configured to form said at least first subgroup SC of cells by selecting at most K cells from the M cells in said wireless communications network. The selection is performed in such a way that a function of the weights $a_{ij}$ for each cell $C_i$ and $C_j$ being in the subgroup SC is approximately maximized. In a variant of this embodiment, the function is the sum of the weights $a_{ij}$ for each cell $C_i$ and $C_j$ being in the subgroup SC. Furthermore, the arrangement comprises a sending unit, configured to send a message to each cell $C_k$ in the subgroup SC comprising data relating said cell $C_k$ to said subgroup SC.

According to a further embodiment of the present invention, at least some of the objects are achieved by a method in a network node for gathering statistics in a wireless communications network comprising M cells. The network node serves at least one cell $C_i$ comprised in the M cells. Furthermore, the network node has at least one mobile terminal connected to it, the mobile terminal being located within the at least one cell $C_i$. According to the method, the network node receives at least one measurement report from the at least one mobile terminal. The at least one measurement report comprises data relating to the signal strength received from at least one neighboring cell $C_j$, thus indicating which neighboring cells cause interference to the reporting mobile terminal. In a further step, the network node determines at least one metric relating to a radio network characteristic dependent on the cell $C_i$ and the at least one neighboring cell $C_j$, based on the at least one measurement report.

In a variant of this embodiment, the metric comprises statistics indicating the number of mobile terminals experiencing interference from each neighboring cell $C_j$, based on the at least one measurement report. By using actual measurements from mobile terminals, statistics can be determined that take the actual traffic distribution into account. Such statistics may be used to enable the formation of more efficient coordination areas.

In a further variant of this embodiment, the statistics is used to determine at least one weight $a_{ij}$ associated with the cell $C_i$ and a neighboring cell $C_j$. The weight $a_{ij}$ indicates a radio network characteristic dependent on the cell $C_i$ and the neighboring cell $C_j$. Thus, in this variant the statistics serve as the basis for determining weights which may be used in other embodiments for forming subgroups, i.e. coordination areas.

According to a further embodiment of the present invention, at least some of the objects are achieved by an arrangement for a network node for gathering statistics in a wireless communications network comprising M cells. The network node serves at least one cell $C_i$ comprised in the M cells. Furthermore, the network node has at least one connected mobile terminal, which is being located within the at least one cell $C_i$. The arrangement comprises a receiving unit, arranged to receive at least one measurement report from the at least one mobile terminal. The at least one measurement report comprises data relating to the signal strength received from at least one neighboring cell $C_j$. The arrangement further comprises a statistics unit, configured to determine statistics relating to a radio network characteristics which is dependent on said at least one cell $C_i$ and said at least one neighboring cell $C_j$, based on the at least one measurement report.

In a variant of this embodiment, the statistics unit is configured to determine statistics indicating the number of mobile terminals experiencing interference from each neighboring cell $C_j$, based on the at least one measurement report.

By determining weights between cells based on characteristics of a real network, and using these weights to form groups of cells suitable for coordination, embodiments of the present invention enable performance improvements of multiple cell coordinated operation beyond homogenous deployments into realistic, heterogeneous network topologies. Examples of such coordinated techniques include CoMP (Coordinated Multi Point transmission reception) and ICIC (Inter Cell Interference Coordination).

Thus, an advantage of the present invention is that it enables suitable coordination areas to be formed in heterogeneous environments.

A further advantage of some embodiments of the invention is that the current traffic situation is taken into account when forming the subgroups, leading to more efficient coordination between the cells.

DETAILED DESCRIPTION

Figure 1:
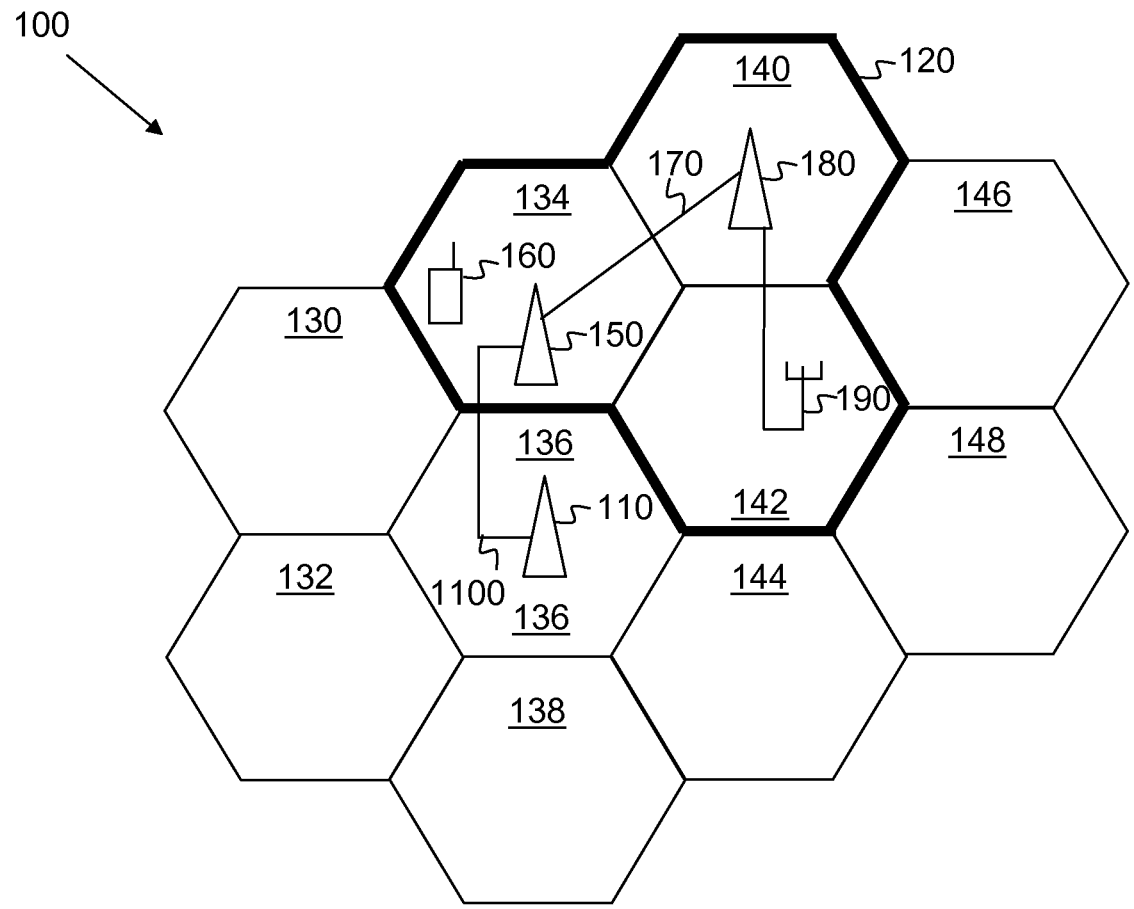
FIG. 1 is a schematic diagram illustrating a wireless communications system according to prior art.

The present disclosure will describe two main approaches to forming coordination areas, which assume different amounts of knowledge of the network deployment.

In the first approach, the coordination areas are formed based on the radio-distance of the cells. The radio distance corresponds to the average path loss and shadow fading, while it also includes the antenna directions and patterns. These characteristics may be measured or estimated in various different ways, as will be further described below. Thus, the objective is to group together cells that jointly have small radio distances, or stated differently, large joint path gains. If the path gain between mobile terminal positions in one cell coverage area and the infrastructure node for communication to another cell coverage area, and vice versa, is large, this implies that transmissions in one of these cells will cause significant interference to the other cell. Coordination of these cells may enhance the transmission quality by means of e.g. suppression of the interference and/or increased received signal strength, facilitating a higher utilization of the radio resources.

This approach to forming groups of cells is well suited to be done in a basically static manner. It can then be implemented either during the phase of building a new network when placing new sites/cells, or when upgrading an already existing network topology by adding a radio technology which can support coordination among eNBs. The formed groups may only be meaningful to change by making new series of measurements, resulting in a new cell grouping. This may be necessary for example when new sites/cells have been added, when the antennas have been replaced with new ones which have different patterns, after a tuning of the network, e.g. if antenna tilts and/or pointing directions have changed, or in general when the environment around the eNBs has changed. Since the groups can be changed under certain circumstances, this approach will be referred to as the semi-static approach in the following disclosure. Finally, this method can support both types of physical architectures for the transport network, i.e. dedicated links or a switched network, as will be further described below.

In the second approach, referred to as the semi-adaptive approach, the coordination areas are formed based on measurements by mobile terminals located in the cells. This method is more dynamic, since it takes actual traffic distribution into account. Therefore, it will give an accurate estimate of the experienced interference between the cells. The basic idea of this approach is that groups are formed in semi-dynamic way, i.e. on a slow time scale, based on the interference coupling among eNBs. The objective of the cell-grouping algorithm is to group cells served by eNBs that have as large a common interfered set of users as possible. Basically, this means that two cells should be part of the same coordination area if a large part of the users in either cell are interfered by transmissions in the other cell. By grouping such cells, the transmission quality can be enhanced, e.g., the interference can be coordinated or signal strengths increased thus leading to throughput increase.

The semi-adaptive approach can be implemented either during the testing period of a newly deployed network, or during normal operation of the network. The time scale of the updates of the groups may vary depending on the needs of the operator and the type of coordination that the new radio technology supports. Usually, traffic is concentrated in different locations during morning hours than in the afternoons. Thus, one possible scenario is that the groups change slowly over parts of the day, following predictable changes in traffic distribution of the traffic. This method may be implemented using a switched type of transport network. It may also be applied in a system with dedicated links, given the additional constraint that cells belonging to the same group must have a direct or indirect connection between them.

Figure 2:
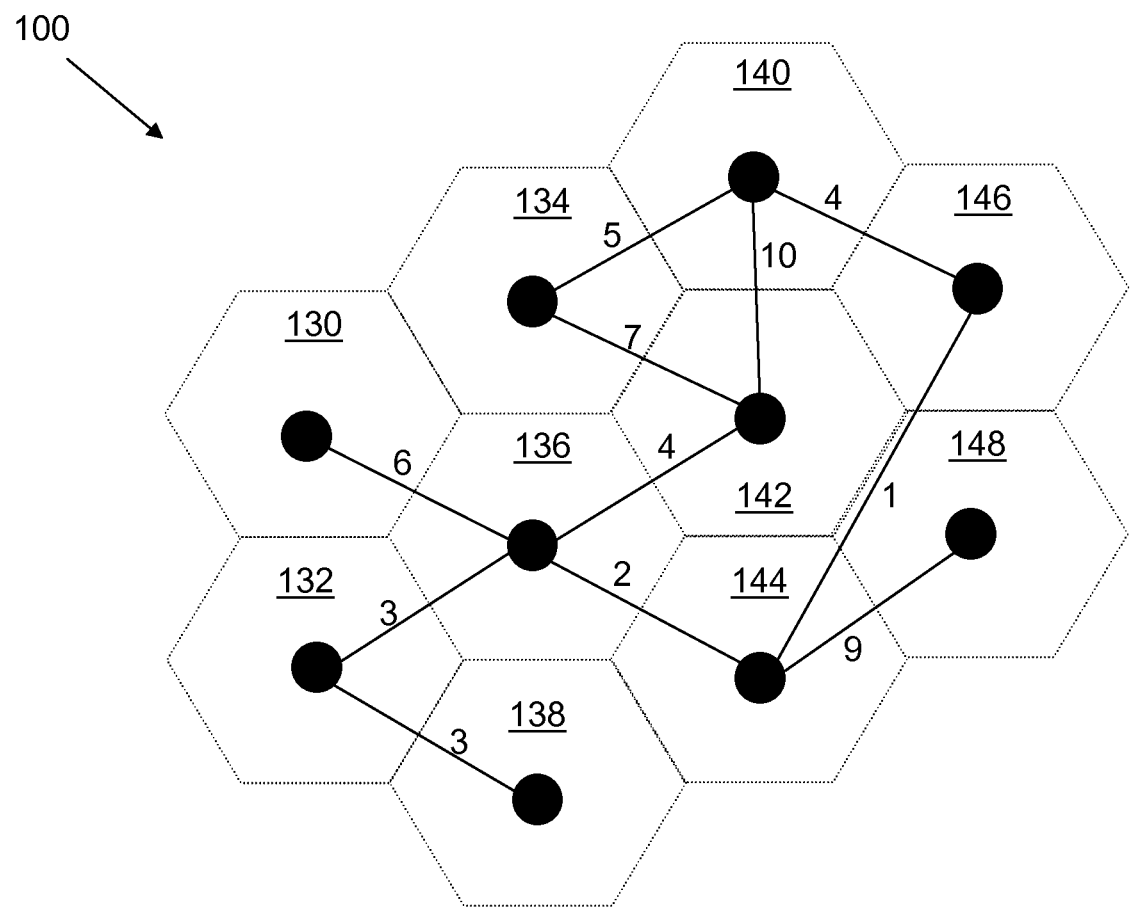
FIG. 2 is a schematic diagram illustrating a wireless communications system according to an embodiment of the present invention.

The present invention is based on the realization that efficient coordination areas of cells in a wireless network may be formed by applying techniques from mathematical graph theory. Referring to FIG. 1, if each cell 130, 132 . . . 148 in wireless network 100 is viewed as a vertex in a graph, the level of coupling, or inter-cell interference, between a pair of cells may be modelled as a weighted edge between the corresponding vertices. FIG. 2 shows an example of such a weighted graph, created for the cells 130, 132 . . . 148 in the wireless communications network 100 of FIG. 1. The edges between the vertices are labelled with numbers, corresponding to the weight of that edge. For instance, the weight of the edge between cells 130 and 136 is 6.

Once the weights have been determined, coordination areas that approximate optimal groupings can be formed by applying heuristic methods for finding maximum-weighted subgraphs or cliques within the graph.

To facilitate the understanding of the invention, a brief mathematical background will now be given.

Consider a real network topology, e.g. an LTE radio access network, where network nodes, e.g. eNBs (evolved NodeBs), are placed in such a way as to provide the coverage and capacity that an operator desires. We assume that in general, the network consists of L cells which cover a substantial area, for example a big city. FIG. 2 shows an example of such a network, comprising 10 cells.

As mentioned above, a wireless communications network, i.e. a cellular network, may here in principle be seen as a weighted graph G. So, let G=(V,E) be a graph where V={1, 2, . . . , L} is the set of vertices, and E ⊂ V×V is the set of edges. In this graph, each vertex corresponds to a cell, and the weight of the edge between two vertices models the relation between these two cells. The definition of this relation is subjective to the problem we want to solve and the way we have defined the graph. In our case, each edge models the perceptiveness of the mutual dependency, i.e. the inter-cell interference, between the two connected vertices, i.e. cells. Methods for determining the mutual dependencies between the cells will be described in detail below.

For the moment, we will assume that each edge which connects two vertices {i, j} is weighted by a number $a_{i,j} \in R$, node i impact on node j. In FIG. 2, each edge is labelled with a number which indicates the weight between the vertices. These weights can be grouped in a matrix $A_G = [a_{ij}]_{L \times L}$ which corresponds to the adjacency matrix of the graph G. If the graph G is undirected (i.e. $a_{ij} = a_{ji}$), the matrix AG will be a symmetrical matrix, which is the exemplified situation in FIG. 2. This matrix gives a compact representation of the mutual dependency among the cells of the network. It is noted that it is possible to use two adjacency matrices, one reflecting downlink values, and one reflecting uplink. Alternatively, a single matrix may be used, comprising combined values for both links. Based on the graph representation of the network and its adjacency matrix, the set of cells can be partitioned in groups or cliques to form coordination areas, as will be further explained below.

A connected subgraph is a subset S ⊂ V such that there exists a path from every vertex in the subset to every other vertex in the subset. That is, there are no isolated "islands" of vertices in the subset. A subset of cells that correspond to a connected subgraph are likely to be suitable candidates for inclusion in the same coordination area. This is because all the cells have a mutual dependency with at least one other cell in the subset. The fact that there is at least an indirect path connecting all the vertices, i.e. cells, also implies that the subset of cells are located within a continuous radio coverage area.

Referring again to FIG. 2, the cells 130, 132, 136 and 138 form a connected subgraph. The cells 130, 136 and 138, however, do not form a connected subgraph, since there is no path from cell 138 to cell 130 or 136, if cell 132 is not included.

In case there is a subset S ⊂ V which is fully connected or $a_{ij} \neq 0, \forall i, j \in S$, then this subset is called a clique. In FIG. 2, the cells 134, 140 and 142 correspond to a clique. The clique theory is an attractive way to solve the problem of cell grouping, since the inherent characteristic of a clique is that every cell that belongs to it can perceive all the other cells that are members of the same clique. In the present case, this means that all the vertices, or cells, in a clique have a mutual dependency with every other vertex. In other words, transmissions in one of the cells in the group are heard by all the other cells, which means that there is a strong likelihood that the dominant interferer of each cell belongs to the same group. Hence, coordination among these cells will likely result in a higher utilization of the scarce radio resources. On the other hand, cells that belong to different groups are likely to be less mutually dependent, which means that the interference between these cells may be negligible.

Generally speaking, the ultimate objective of the cell-grouping problem is to find the optimum partition of the set of vertices, or in other words to find a number of independent maximum weighted cliques, or more generally, connected subgraphs, under the constraint that each group cannot contain more than a predetermined number of vertices K. This problem can be formulated as follows:

$$\max_{S \subseteq V} \sum_{i,j \in S} a_{ij}$$

subject to:

$$|S| \leq K$$

In addition to the above constraint, a number of other constraints can be applied. For example, the physical connections among the eNBs serving the cells may give an additional constraint on which cells can be grouped. Other constraints can be the latency of the transport network or the capacity that it can handle, but it is expected that both of these constraints fall under the general constraint on the maximum number of vertices that each group can have, i.e. the maximum number of cells that can be coordinated.

The optimization problem described above is known to be an NP-hard (nondeterministic polynomial-time hard) problem. This effectively means that there is no known algorithm that will yield a perfect solution to this problem in polynomial time.

For the purpose of forming coordination areas, a sub-optimal greedy type of search algorithm may be applied. Basically, this algorithm tries to find the maximum weighted graphs, and it comes in two versions depending on the constraints of the physical architecture of the transport network.

In case there are physical connections among all eNBs, e.g. via the transport network, but they have to be enabled by corresponding switches, the greedy search algorithm comprises the following steps:

1. Select a first vertex i, i.e. a starting cell. Add the first vertex to the group $S_1=\{i\}$. The first vertex may be randomly selected. It is also possible to select the first vertex based on a metric, e.g. load, number of strong interferers, etc. A benefit of basing the selection on a metric is to ensure that the groups will be centred around a vertex, i.e. cell, where a significant benefit may be achieved from using CoMP. This is usually the case e.g. for a highly loaded cell. This is because a highly loaded cell may operate close to its capacity limit or may not be able to serve all incoming traffic. Hence, if the transmission efficiency can be enhanced by coordination with neighboring cells a highly loaded cell may take on even more traffic. Optionally, the vertices may be sorted according to the metric which will be applied, prior to performing step 1. Depending on the total number of vertices, sorting may be beneficial as it will speed up the process of selecting the first vertex.

2. Among the neighbor vertices of group $S_n$, select the one with the largest weight $S_{n+1}=S_n \cup \{j: \arg\max a_{ij} \forall i \in S_n\}$ 3. Repeat step 2 until there are no vertices left in the graph, or the maximum limit K, i.e. the maximum allowed number of vertices in the group, has been reached.

4. In case there are still vertices in the graph, go to step 1 to form a new group.

In the case where physical connections are not available among all the eNBs, the algorithm comprises an additional step, performed after step 2 above:

2a. Check if a physical connection exists between vertices i,j. If not, remove j from the $S_{n+1}$ list and go to step 3.

In another exemplary heuristic algorithm, steps 1, 3 and 4, and optional step 2a, are performed as in the example above. However, in step 2, the neighbor vertex $S_{n+1}$ is selected such that the sum of the weights between the vertices in group $S_n$ is approximately maximized. That is, the algorithm does not take only the single largest weight into account, but considers all the weights between the neighboring vertex and the vertices already included in $S_n$. An advantage of this algorithm is that it will tend to favour vertices that are connected to many other members of the group. Thus, this algorithm is more likely to form groups which are also cliques. As previously discussed, sets of cells that form cliques are usually good candidates for coordinated transmission.

The two exemplary heuristic algorithms described above may be implemented by using one or more adjacency matrices comprising the weights between vertices. In the adjacency matrix, the most interfered cell is given by max sum over column minus the diagonal value. The same operation over rows will give the most interfering cell.

In the above description of how groups may be formed, it has been assumed that the weights between vertices, i.e. cells, have already been determined. In the following sections, we will describe in detail how calculation of weights may be performed in the semi-static and the semi-adaptive approaches.

As previously described, in the semi-static approach the weights of the network graph correspond to the path gain among the eNBs and their related coverage areas of the network. The path gain comprises the distance attenuation, shadow fading and antenna gains or patterns. This composite information gives an estimate not only of the distance between the eNBs and related coverage areas but also of the environment around them.

The values of the path gains among the cells of the network that we want to apply cell grouping to may be retrieved in different ways, depending on whether the network has already been deployed or is still in the development phase. In the first case, the site infrastructure exists and the operator wants to reuse the existing sites/cells, but using a newer technology, which for instance supports CoMP. The second case is valid when the operator has not yet deployed the new sites/cells that will support the new radio technology.

In the case of planning/development of a new network deployment, the weights may be calculated based on several methods. First of all, the weights can be estimated using mathematical formulas. The operator needs to know the site locations and the corresponding related planned coverage areas and thus the distances between the sites, the antenna patterns, and the statistical characteristics of the shadow fading of the area that will deploy the network. Based on this knowledge, formulas like the following may be used in order to provide an estimate of the path gain value $PG_{i,j}$ between two cells i and j:

$$a_{ij}PG_{i,j}(dB) \approx C + 10n \log_{10}(d_{ij}) + G_{Tx} + G_{Rx}$$

The first two terms correspond to the distance attenuation, $G_{Tx}$ is the gain of the transmitter antenna, and $G_{Rx}$ is the gain of the receiver antenna.

The weights, e.g. in the form of an adjacency matrix as described above, may also be predicted by using different network planning tools. These tools can provide realistic predictions of the radio environment, i.e. path gain, of a practical deployment scenario by using 3d maps, building databases and advanced propagation models.

The weights may be defined and calculated/predicted for a single position in the planned coverage area, e.g. an expected typical position or an area average position. Alternatively, statistics over all positions within the planned expected coverage area is calculated/predicted and e.g. the average, median, or some percentile outcome from the statistics may be used for the weights. Further, the selection of target coordination areas can be made dependent on the selected CoMP technique(s) and further to which link focus will be addressed, either for UL functionality, for DL functionality or for both. The adjacency matrix values may be related to and calculated/predicted for the downlink (DL), the uplink (UL) or any combination thereof.

The expected working procedure is that normal coverage and traffic planning process are performed and then the calculation/prediction of the weights, e.g. adjacency matrix, is performed before the coordination area selection. The procedure may be iteratively done to optimize the deployment and added as an integrated step into the planning process.

The above methods may also be used to estimate or predict the weights in the case of an already deployed network. However, in this case the operator may also perform actual measurements of the radio distances among the base stations, using on-field measurement techniques. Such measurements are typically supported by standards, and statistics may easily be collected.

In the semi-adaptive or dynamic approach, the weights are determined in a dynamic way, based on the distribution of the traffic load inside the network. In this approach, the weights may correspond to the mutual interference among the cells or eNBs. One example of how the weights may be determined is the following: The weight $a_{ij}$ of an undirected edge connecting two vertices, i.e. nodes $\{i,j\}$ is equal to the probability that a user served by cell i has cell j as the dominant interferer, or vice versa. Stated another way, $100*a_{ij}$ is the percentage of users in cells i and j that have the other cell as dominant interferer. Hence:

$$a_{ij}=Pr(UE \text{ connected to } i \text{ or } j \text{ has } i \text{ on as dominant interferer}) \Rightarrow$$

$$a_{ij}=Pr(I_{ue}=i|ue\epsilon j)\cdot Pr(ue\epsilon j)+Pr(I_{ue}=j|ue\epsilon i)\cdot Pr(ue\epsilon i)$$

Where $I_{ue}$ is the index to the dominant interfering cell of user ue. A large value for the weight between two cells basically means that each cell interferes with a large portion of the users of the other cell, i.e. the impact factor of the interference is not negligible. Since the method of semi-adaptive cell grouping is applicable in the case of an already deployed network, the different factors in the above equation may be calculated using e.g. statistics of the traffic distribution over the area, or radio environment measurements, such as C/I (Carrier-to-Interference ratio), performed by the UEs or the eNBs of the network. It should be noted that within one single cell, it is possible to determine the dominant interfering cells for UEs connected to that cell. In other words, given two cells $C_i$ and $C_j$, corresponding to vertices i and j, the cell $C_i$ may measure $b_{ij}=Pr(I_{ue}=j|ue\epsilon i)\cdot Pr(ue\epsilon i)$. Correspondingly, cell $C_j$ may measure $b_{ji}=Pr(I_{ue}=i|ue\epsilon j)\cdot Pr(ue\epsilon j)$. The measurements $b_{ij}$ and $b_{ji}$ must then be added together to determine $a_{ij}$. Note also that $b_{ij}$ and $b_{ji}$ are not necessarily equal; however, this equation will still give a reasonable estimate of $a_{ij}$. Further, $b_{ij}$ and $b_{ji}$ may directly be used in a directed edge model approach to form $a_{ij}$ and $a_{ji}$, respectively. These measurements and how they may be used to determine weights will be described in more detail below.

A method for forming a subgroup of cells for coordinated transmission and/or reception according to an embodiment of the invention will now be described with reference to FIG. 3 and the flowchart in FIG. 4. Note that the term subgroup refers to a coordination area, i.e. a group of cells. The present embodiment uses the semi-static approach described above to determine the undirected weights of the network graph. In other words, the weights correspond to the path gain among the eNBs and their related coverage areas of the network. The same principles can be applied if a directed edge method and model is applied.

Figure 3:
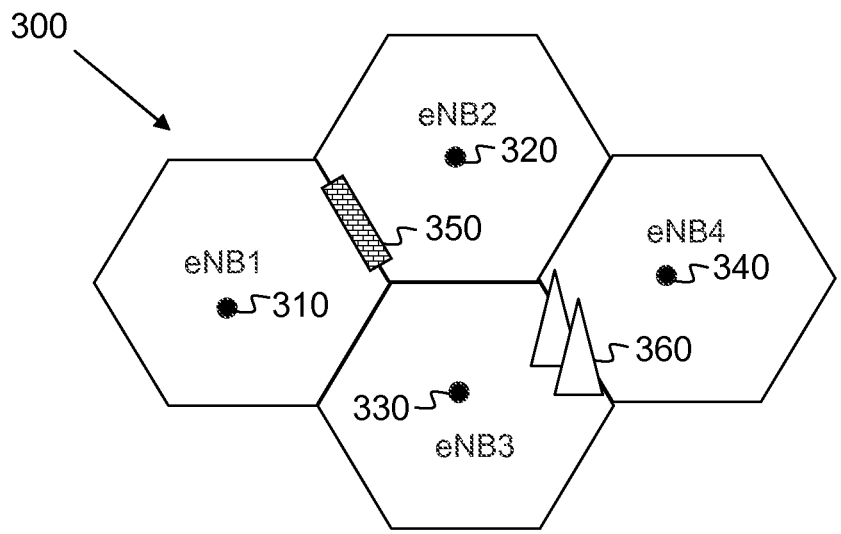
FIG. 3 is a schematic diagram illustrating a wireless communications system according to an embodiment of the present invention.
Figure 4:
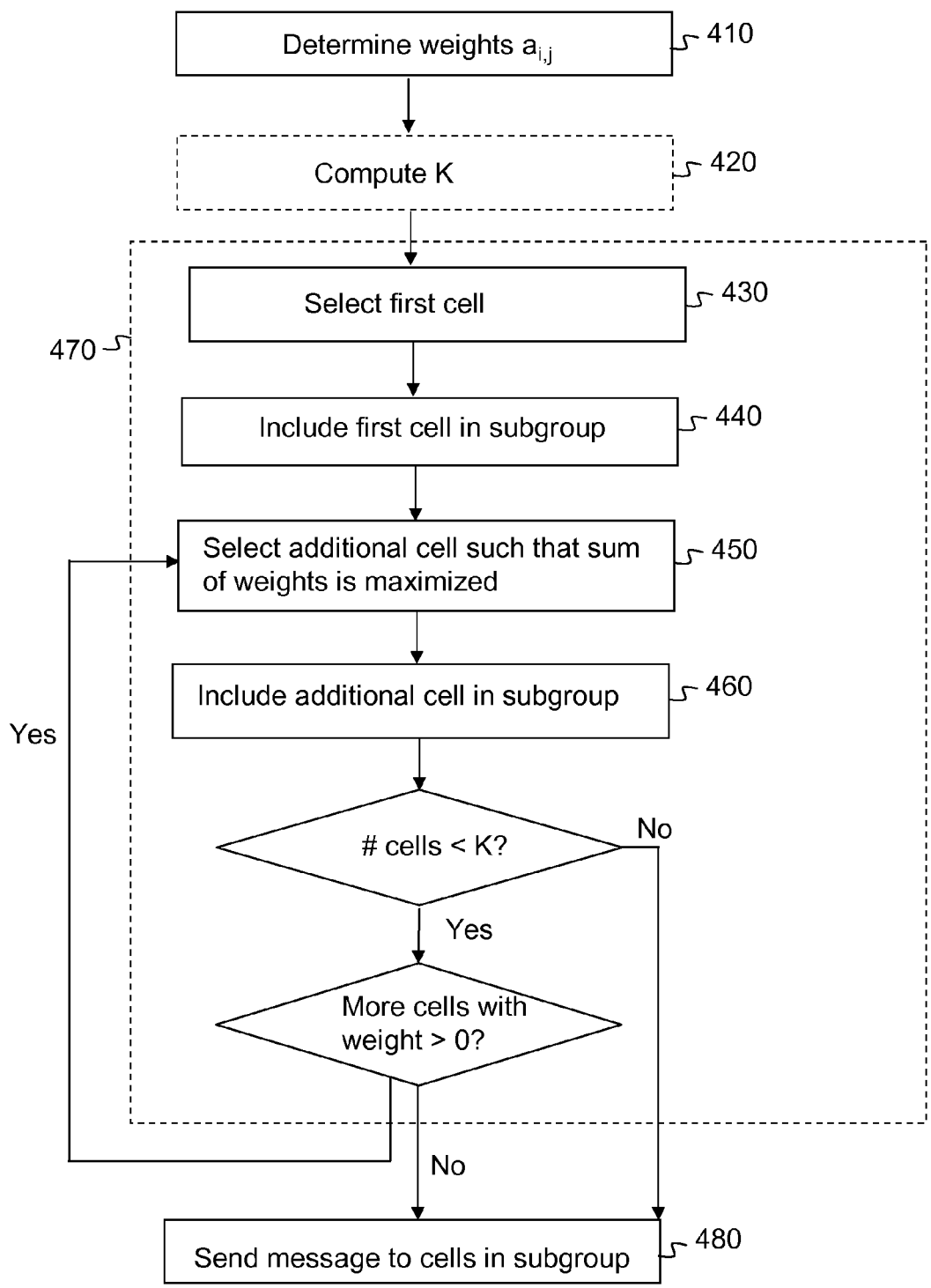
FIG. 4 is a flow chart illustrating a method in a network node according to an embodiment of the present invention.

According to this embodiment, the method is performed in a network node 310 comprised in a wireless communications network 300, as shown in FIG. 3. The wireless communications network 300 is an LTE radio access network comprising four cells, served by network nodes 310, 320, 330, and 340, which in the present example are eNBs. In this case, the network is already deployed, i.e. the site infrastructure exists and the operator wants to reuse the existing sites/cells, but using a newer technology, which for instance supports CoMP. Although the cells are drawn here as hexagonals, it will be appreciated that in a real deployed network the cells may be shaped differently, e.g. the cells may be substantially circular, be partly overlapping, and some cells may be completely contained within other cells.

It should be noted that the present invention may also be applied in other types of wireless networks, e.g. WCDMA, WiMAX, UMB or GSM.

In the present embodiment, the number of coordinated cells is limited to two, due to the processing overhead and limitations in the transport network referred to above. In other words, each coordination area may comprise at most two cells. However, this limitation is only for exemplary purposes. In other embodiments, the size of the coordination areas may be limited a number of cells larger than two.

In a first step 410, the network node 310 determines or obtains weights $a_{12}$, $a_{13}$, $a_{14}$, $a_{24}$, $a_{23}$, and $a_{34}$. The weights are determined by path gain measurements using on-field measurement techniques or simulations, as described above. Each weight $a_{ij}$ indicates the path gain between the first cell $C_i$ and said second cell $C_j$. Thus, weight $a_{12}$ is associated with cell $C_1$ 310 and cell $C_2$ 320 and indicates the path gain between these cells, weight $a_{13}$ indicates the path gain between cell $C_1$ 310 and cell $C_3$ 330, and so forth.

In a variant of this embodiment, the weights are determined using a different method. For instance, the weights may be determined using a network planning tool, or estimated using mathematical formulas, as described above.

Figure 5:
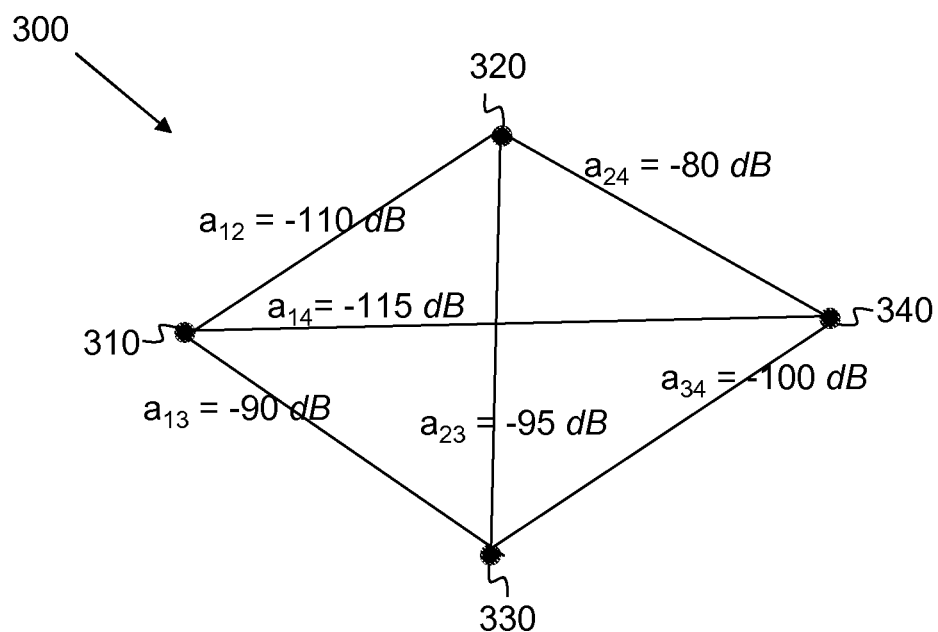
FIG. 5 is a schematic diagram illustrating weights between cells according to an embodiment of the present invention.

FIG. 5 is a simplified illustration of the wireless communications network 300 of FIG. 3, showing the weights between the eNBs. As can be seen in FIG. 5, the path gain between eNBs 310 and 320 and their related coverage areas, as well as eNBs 330 and 340 and their related coverage areas, is quite low even though these nodes are neighbors. This is due to the fact that there are physical obstacles between the cells. For instance, as shown in FIG. 3, there is a large building 350 between cells 310 and 320, and there is a hill or mountain 360 between cells 330 and 340. These obstacles increase the isolation between these cells and thus, the path gain is affected.

In a further step 470, the network node 310 forms a first subgroup $SC_1$ of cells, by selecting at most two cells from the four cells in the wireless communications network 300. The two cells are selected so as to approximately maximize the sum of the weights $a_{ij}$ for each cell $C_i$ and $C_j$ which are part of the subgroup $SC_1$. The step 470 of forming the first subgroup comprises a series of substeps 430-460, which will now be described.

In step 430, the network node 310 selects a first cell, which will be denoted $C_{first}$, from the four available cells. In the present embodiment, the first cell is randomly selected to be cell $C_1$ 310. In a variant of this embodiment, the first cell is selected according to a cell-dependent metric, e.g. cell load.

The selected first cell is included in the subgroup $SC_1$ in step 440. Thus, the subgroup $SC_1=\{C_1\}$ In the next step 450, the network node 310 selects an additional cell from the four cells. This selection is performed such that there exists at least one weight $a_{n,sc}\square 0$ associated with the cell $C_n$ and a cell $C_{sc}$ in the subgroup $SC_1$. Since the subgroup $SC_1$ at this point comprises only one cell $C_1$, the candidate cells for selection are those that have a weight $\square 0$ in relation to $C_1$. Looking at FIG. 5, it can be seen that all the remaining cells $C_2$ 320, $C_3$ 330, and $C_4$ 340 have weights $\square 0$ in relation to $C_1$, so all three cells are possible candidates for inclusion. However, an additional condition is that the additional cell should be chosen so that the sum of all weights within the subgroup $SC_1$ is maximized. Looking at FIG. 5, cell $C_3$ 330 has the highest path gain in relation to $C_1$, −90 dB, and therefore has the best chance of being able to cooperate well with cell $C_1$. Thus, cell $C_3$ is included in the subgroup $SC_1$ in step 460, and $SC_1=\{C_1, C_3\}$ Since the maximum number of cells, 2, is now reached, the formation of subgroup $SC_1$ is completed.

It is pointed out that since, in each iteration of the algorithm, the additional cell is selected such that the sum of weights in the resulting subgroups is maximized, the algorithm will form a subgroup in which the total sum of all weights is at least approximately maximized.

In a variant of the present embodiment, step 470 of selecting the cells also involves verifying that there is a physical backbone communication link between each pair of eNBs $eNB_i$ and $eNB_j$ within the subgroup SC. This variant is applicable if the wireless communications network 300 uses dedicated links for the transport network. As mentioned above, this means that some nodes may not be connected to each other in the backbone transport network. Since such nodes cannot exchange information with each other, it is not beneficial to include them in the same coordination area.

It should be noted that, according to some variants of this embodiment, step 470 uses another heuristic method than the one described in steps 430-460. As mentioned above, a number of methods for finding subgraphs or cliques are known from the field of graph theory. Once the weights between the cells have been determined in step 410, any of these known methods may be applied to form the subgroups.

In a step 480, network node 310 sends a message to each cell $C_k$ comprised in subgroup $SC_1$, i.e. cells $C_1$ and $C_3$. The message comprises data relating these two cells to the subgroup $SC_1$. For instance, the message may comprise a list of the other cells that are part of the same subgroup, so that each cell in the subgroup knows with which other cells it should communicate in order to coordinate transmission and/or reception of signals.

Note that there are still cells in the network that have not been assigned to a subgroup. Thus, according to a variant of this embodiment, steps 430-460 and 480 may be repeated to form another subgroup $SC_2$. Following the same steps as outlined above, subgroup $SC_2$ will comprise cells $C_2$ 320 and $C_4$ 340.

Once subgroup $SC_2$ has been formed, all cells in the network have been assigned to subgroups, and the method is finished.

It is emphasized that the formation of the subgroups in step 470 is not dependant on which particular method is used for determining the weights in step 410. Thus, according to further variants of this embodiment, any of the methods described for determining weights may be combined with any of the methods for forming a subgroup.

Although the exemplary embodiment described above uses four cells, served by four eNBs as shown in FIG. 3, the method may be applied to a wireless communications network of any size. The maximum number of cells in a subgroup may also vary within the scope of this embodiment; for instance, the maximum number of cells may be 3, 4 or 5. Thus, according to another embodiment of the present invention, the wireless communications network 300 comprises a number of cells M, where M is an integer >0. According to this embodiment, at least a first subgroup SC is formed comprising at most K cells, where K is an integer <=M. In other words, the maximum number of cells in a subgroup is K.

Referring again to FIG. 4, in this embodiment, step 410 involves determining at least one weight $a_{ij}$ associated with a first cell $C_i$ and a second cell $C_j$ in the wireless communications network 300, wherein the weight $a_{ij}$ indicates the path gain dependent on said first cell $C_i$ and said second cell $C_j$. As mentioned above, the path gain may be determined using on-field measurement techniques, or other methods.

In step 470, the network node 310 forms said at least first subgroup SC of cells by selecting at most K cells from the M cells in the wireless communications network 300, such that the sum of the weights $a_{ij}$ for each cell $C_i$ and $C_j$ being in the subgroup SC is approximately maximized. The selection of cells is performed using steps 430-460, as described above. In other words, a first cell $C_{first}$ is selected from the M cells, and included in the subgroup SC. An additional cell $C_n$ is then selected from the M cells, in such a way that there exists at least one weight $a_{n,sc}\square 0$ associated with the cell $C_n$ and a cell $C_{sc}$ in the subgroup SC. Furthermore, the additional cell is selected so that the sum of the weights $a_{n,l}$ associated with the cell $C_n$ and each cell $C_l$ being in the subgroup SC, l ranging from 0 to the number of cells in the subgroup SC, is maximized. The additional cell $C_n$ is then included in the subgroup SC. The steps of selecting an additional cell and including the additional cell are then repeated until there are K cells in the subgroup SC, or until there are no further cells $C_n$ such that there exists at least one weight $a_{n,sc}\square 0$ associated with the cell $C_n$ and a cell $C_{sc}$ in the subgroup SC. Stated differently, each new cell for inclusion in the subgroup is selected so that the sum of all the weights between the new cell and any of the cells that are already members of the subgroup is maximized. This process is repeated until the maximum number of cells, i.e. K cells, has been reached, or until there are no more cells to select, i.e. no more cells having a weight $\square 0$ with any of the cells already in the subgroup.

In a subsequent step 480, the network node 310 sends a message to each cell $C_k$ in the subgroup SC comprising data relating said cell $C_k$ to said subgroup SC. That is, each cell in the subgroup is informed of the other group members, so that the cells may exchange information with each other.

In a variant of the present embodiment, the network node 310 performs an additional step of computing the value K, i.e. the maximum number of cells in a subgroup, before the groups are formed in step 470. As previously discussed, K should be chosen large enough to gain the benefits of CoMP, and small enough to not cause too much complexity and load in the transport network. Thus, a network-related constraint is used to compute K. For instance, K may be based on the network latency and/or capacity, or the signal processing capabilities of the nodes. A high network capacity implies that the transport network is able to handle larger subgroups. Conversely, a high latency means that K should be reduced. An advantage of computing K in this way is that the maximum number of cells in a subgroup is chosen based on real network constraints, thus ensuring that the transport network can handle the coordination information.

It is pointed out that all the variants described in connection with the more specific embodiment described above, and illustrated in FIG. 3, are also applicable to the present, more generic, embodiment.

In another embodiment of the present invention, the subgroups are formed by finding cliques of cells within the network. As mentioned above, a clique in the present context is a set of cells which all have weights ≠0. That is, for any pair of cells $C_i$ and $C_j$ within the clique, the weight $a_{ij}$≠0. This means that there is a mutual dependency between all cells within the clique, i.e. transmissions in one cell will reach all the other cells. As described above, such cells are good candidates for inclusion in the same coordination area, i.e. subgroup. Alternatively, a threshold value could be used; that is, any pair of cells $C_i$ and $C_j$ within the clique would have a weight $|a_{ij}|$>threshold.

According to this embodiment, step 410 of determining the weights is performed in the same way as described in the embodiments described above in connection with FIGS. 3 and 4.

Steps 430 and 440 are also performed as described above.

Step 450 is performed as described above, but an additional constraint is added. The additional cell $C_n$ is selected so that there exists a weight $a_{ij}$≠0 for each pair of cells $C_i$ and $C_j$ that are in the subgroup SC. Thus, according to this embodiment, cells forming a maximum weighted clique will be assigned to the same subgroup. According to a variant of this embodiment, the additional cell $C_n$ is selected so that there exists a weight $|a_{ij}|$>$w_{thresh}$, where $w_{thresh}$ is a predefined threshold value.

Again, the variants described in connection with the previous two embodiments are applicable to this embodiment as well.

A method for forming a subgroup of cells for coordinated transmission and/or reception according to another embodiment of the invention will now be described with reference to FIG. 6 and the flowchart in FIG. 7. As mentioned above, the term subgroup refers to a coordination area, i.e. a group of cells.

This embodiment uses the semi-adaptive method, i.e. the subgroups are formed in a dynamic way, taking into account the distribution of the traffic load inside the network. In the present embodiment, the weights correspond to the mutual interference among the cells.

Figure 6:
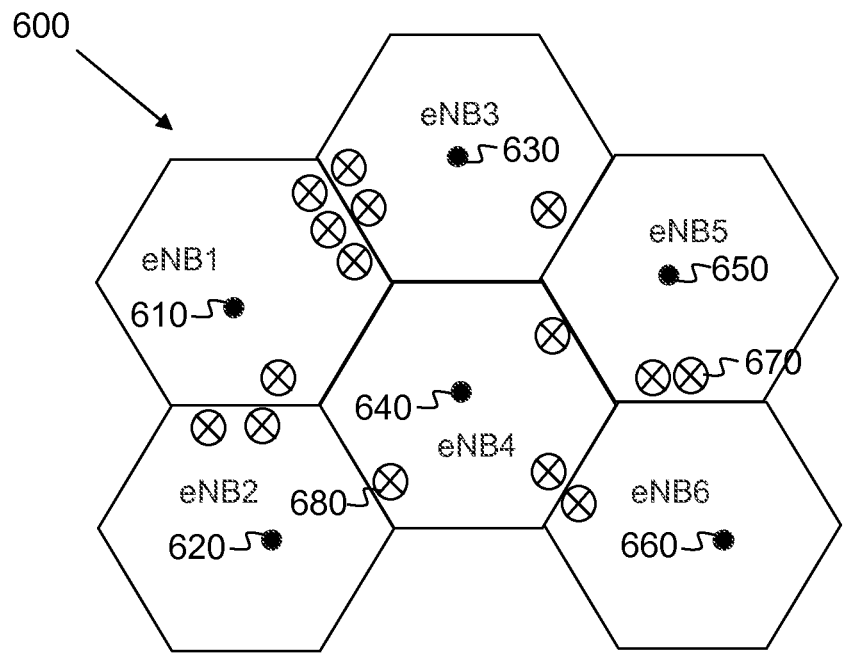
FIG. 6 is a schematic diagram illustrating a wireless communications system according to an embodiment of the present invention.
Figure 7:
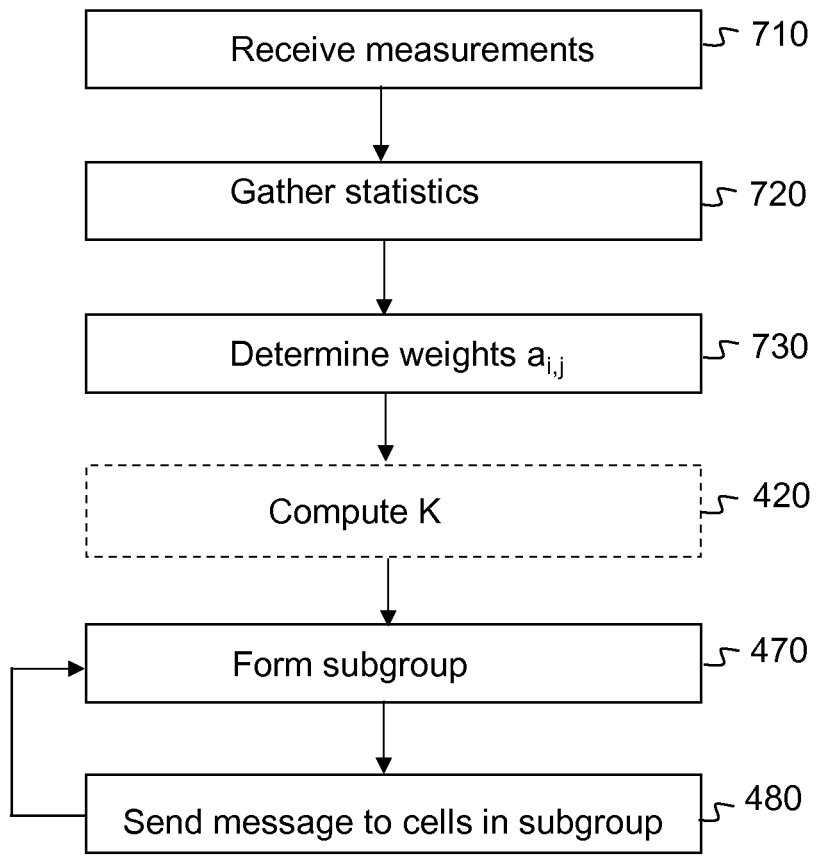
FIG. 7 is a flow chart illustrating a method in a network node according to an embodiment of the present invention.

The method is performed in a network node, e.g. an eNB 610, comprised in a wireless communications network 600, as shown in FIG. 6. The wireless communications network 600 is an LTE radio access network comprising six cells, served by eNBs 610, 620, 630, 640, 650 and 660. The currently active, i.e. connected, user equipments (UEs) within the wireless communications network 600 are shown as rings with crosses in FIG. 6. Thus, the number of connected users in each cell equals the number of crosses in the cells, i.e. for cell 610 there are four users, cell 620 has two users, etc. The position of the crosses indicates which other cell is the dominant interferer for that particular UE, so that each cross is drawn next to the edge of the dominantly interfering cell. For example, the UE 680 receives strong interference from cell 620, and the UE 670 receives strong interference from cell 660.

In the present embodiment, the number of cells within a subgroup is limited to a maximum of three. The method steps for forming the subgroups will now be described with reference to the flowchart in FIG. 7.

In a first step 710, eNB 610 receives at least one measurement report from one or more of the UEs connected to the network node 610. As mentioned above, each measurement report indicates signal strength for a number of neighboring cells which the UE is measuring on, i.e. neighbor list measurements. Based on the indicated signal strength for each neighboring cell, the network node 610 can determine the dominantly interfering cell for the measuring UE. The dominant interferer is simply the neighboring cell with the highest signal strength, since it will cause the most interference towards the measuring UE.

In step 720, eNB 610 receives at least one message from at least one of the other eNBs 620, 630, 640, 650 and 660 in the wireless communications network 600. The other eNBs 620, 630, 640, 650 and 660 will also gather measurement reports and estimate the dominant interferer for each connected UE, as described in connection with step 710 above. The at least one message received in step 720 comprises information about the dominant interfering cell for each UE connected to the eNB sending the message. Referring to FIG. 6, the message received from eNB 640 will comprise the information that UE 680 has cell 620 as its dominant interferer. The message will also comprise information about the other two UEs in the cell. Thus, the message provides information about which cells are causing interference for which users, which gives an indication of the level of mutual interference between the eNB sending the message and other cells in the wireless communications network 600.

In a further step 730, the eNB 610 determines weights $a_{12}$, $a_{13}$, $a_{14}$, $a_{15}$, $a_{16}$, $a_{23}$, $a_{24}$, $a_{25}$, $a_{26}$, $a_{34}$, $a_{35}$, $a_{36}$, $a_{45}$, $a_{46}$, and $a_{56}$. In the present embodiment, the weight between two cells equals the percentage out of the total number of UEs that are served by either one of the two cells, and has the other cell as its dominant interferer.

To clarify how the weights are calculated, we first observe that there are a total of 16 UEs within the wireless communications network 600 shown in FIG. 6. To determine the weight between eNBs 640 and 660, for instance, eNB 610 looks at the information that was received from network nodes 640 and 660 in step 710. From this information, network node 610 can derive that there is one UE connected to eNB 640 that has cell 660 as its dominant interferer. Correspondingly, in cell 660, there is also one UE that has reported cell 640 as its dominant interferer. Thus, there are two UEs that are served by either one of cells 640 or 660, and having the other cell, i.e. 660 or 640 respectively, as their dominant interferer. The eNB 610 thus determines that the weight between cells 640 and 660 is $2/16$ corresponding to the value of $a_{46}$.

The weights $a_{14}$, $a_{15}$, $a_{16}$, $a_{23}$, $a_{25}$, $a_{26}$, $a_{34}$, and $a_{34}$ will all be determined to be zero, as further explained below.

Figure 8:
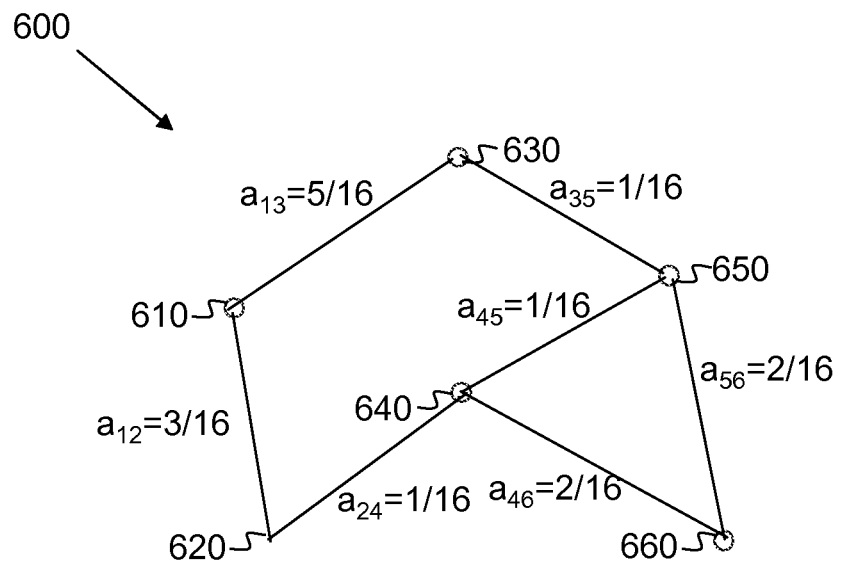
FIG. 8 is a schematic diagram illustrating weights between cells according to an embodiment of the present invention.

FIG. 8 shows the weights for each pair of cells in FIG. 6. When there is no edge drawn between two cells, this means that the weight between the two cells is zero, i.e. no UE in either of those two cells reports being interfered by the other cell. It is also possible that the weight is not zero, but that there is no physical connection between the two eNBs serving the cells. As mentioned above, cells served by unconnected eNBs should preferably not be included in the same coordination area.

Once the weights have been determined, at least one subgroup is formed in step 470. This step comprises a number of substeps 430-460, corresponding to the steps shown in FIG. 4. These steps are not shown in FIG. 7.

In the present embodiment, the cell with the highest load is selected as the starting cell in step 430. In the exemplary wireless communications network 600, network node 610 has the highest number of connected users, and may therefore be considered to have the highest load. Selecting the starting cell based on load may further improve the efficiency of the grouping. This is because a highly loaded cell will, generally speaking, benefit more from coordinated transmission and reception. A highly loaded cell may operate close to its capacity limit or may not be able to serve all incoming traffic.

Hence, if the transmission efficiency can be enhanced by coordination with neighboring cells a highly loaded cell may take on even more traffic. Thus, it is more important to form an efficient coordination area around such a highly loaded cell.

However, in variants of this embodiment the starting cell is selected according to another criterion, such as the number of interfering cells. Another possibility is to use random selection.

Once network node 610 has been selected as the starting cell, steps 450-460 will be performed twice. The first subgroup will comprise cells 610, 630 and 620, since these are the three cells with the maximum sum of weights.

Steps 430-460 may then be executed again, to form a second subgroup comprising cells 640, 660 and 650. According to a variant of the present embodiment, the steps 710-480 are executed periodically. That is, the subgroups are reformed at certain points in time. In a further variant, steps 710-480 are executed according to a predetermined time schedule. For instance, the subgroups could be reformed at 9 AM and at 6 PM. This would take into account the change in network traffic that normally occurs when people arrive at work in the morning, and leave work in the afternoon. During business hours, traffic is likely to be concentrated in business areas, whereas in the evenings, traffic may be higher in residential areas. The start and end of weekends and holidays are other possible candidates for when to reform the subgroups.

According to a further variant, the subgroups that are to be used in the different time periods are formed only once, and then stored for later use. Assuming that the groups are to be changed at 9 AM and at 6 PM, as in the example above, this would mean that the steps 710-480 are executed once at 9 AM and once at 6 PM. The resulting subgroups for each point in time are stored. On the next day at 9 AM, the groups do not need to be recalculated; instead, the stored subgroups for 9 AM are retrieved and used again.

Although in this embodiment each eNB serves only a single cell, as mentioned above, in the general case an eNB may serve more than one cell. It should be noted that the method is applicable to the general case as well, since the eNB to which a UE is connected is aware of which specific cell the UE is camped on. Furthermore, the measurement reports sent by a UE comprise information about which cell the UE has measured on. Note that the weights are determined between pairs of cells, not eNBs.

Although the exemplary embodiment described above uses six cells, served by six eNBs as shown in FIG. 6, the method may be applied to a wireless communications network of any size. The maximum number of cells in a subgroup may also vary; for instance, the maximum number of cells may be 3, 4 or 5, or any other number. Thus, according to another embodiment of the present invention, the wireless communications network 600 comprises a number of cells M, where M is an integer >0. According to this embodiment, at least a first subgroup SC is formed comprising at most K cells, where K is an integer <=M. In other words, the maximum number of cells in a subgroup is K.

Referring once more to FIG. 7, in the present embodiment, step 710 of receiving measurement reports is performed in the same way as already described above.

In step 720, eNB 610 receives at least one message from at least one network node $N_i$, wherein said other node $N_i$ manages at least one cell $C_i$ of the M cells in the wireless communications network 600. The at least one message received in step 720 comprises information that indicates the level of mutual interference between the node $N_i$ sending the message and at least one other cell $C_j$ comprised in the M cells of the wireless communications network 600.

In a variant of this embodiment, the at least one message comprises data relating to the number of users in the at least one cell $C_i$ that are experiencing interference from the at least one other cell $C_j$ comprised in the M cells. For instance, the message may comprise data about the dominant interfering cell for each UE connected to the node $N_i$ sending the message. Another possibility is that the message directly indicates the level of mutual interference between $N_i$ and at least one other cell $C_j$ in the network. This could be achieved if the node $N_i$ and the related $eNB_i$ actively listens, i.e. measures on the received uplink signals, for active users in other cells in the network. It could then determine the level of interference from other cells without using measurements from connected UEs. For instance, this may be achieved by measuring the uplink inter-cell interference from the neighboring cells, since this may indicate the degree of coupling between the cells.

Step 730 involves determining at least one weight $a_{ij}$ associated with a first cell $C_i$ and a second cell $C_j$ in the wireless communications network 300, based on the data comprised in the at least one message received in step 720. That is, the at least one weight $a_{ij}$ is determined based on statistics gathered from other nodes in the network. Thus, in the present embodiment the weights take the current traffic situation into account.

In step 470, the network node 610 forms said at least first subgroup SC of cells by selecting at most K cells from the M cells in the wireless communications network 600, such that the sum of the weights $a_{ij}$ for each cell $C_i$ and $C_j$ being in the subgroup SC is approximately maximized. The formation of the subgroups may be performed in any of the ways previously described in connection with other embodiments. Thus, in one variant of this embodiment steps 430-460 are performed as described above. In another embodiment, cliques are formed.

In a subsequent step 480, the network node 610 sends a message to each cell $C_k$ in the subgroup SC comprising data relating said cell $C_k$ to said subgroup SC. As mentioned above, the purpose of this step is to inform each cell in the subgroup of the other group members, so that the cells may exchange information with each other.

In a variant of the present embodiment, the network node 610 performs an additional step of computing the value K, i.e. the maximum number of cells in a subgroup, before the groups are formed in step 470. For the same reasons as described above in connection with another embodiment, a network-related constraint is used to compute K. For instance, K may be based on the network latency and/or capacity. A high network capacity implies that the transport network is able to handle larger subgroups. Conversely, a high latency means that K should be reduced.

It is pointed out that all the variants described in connection with the more specific embodiment described above, and illustrated in FIG. 7, are also applicable to the present, more generic, embodiment.

Figure 9:
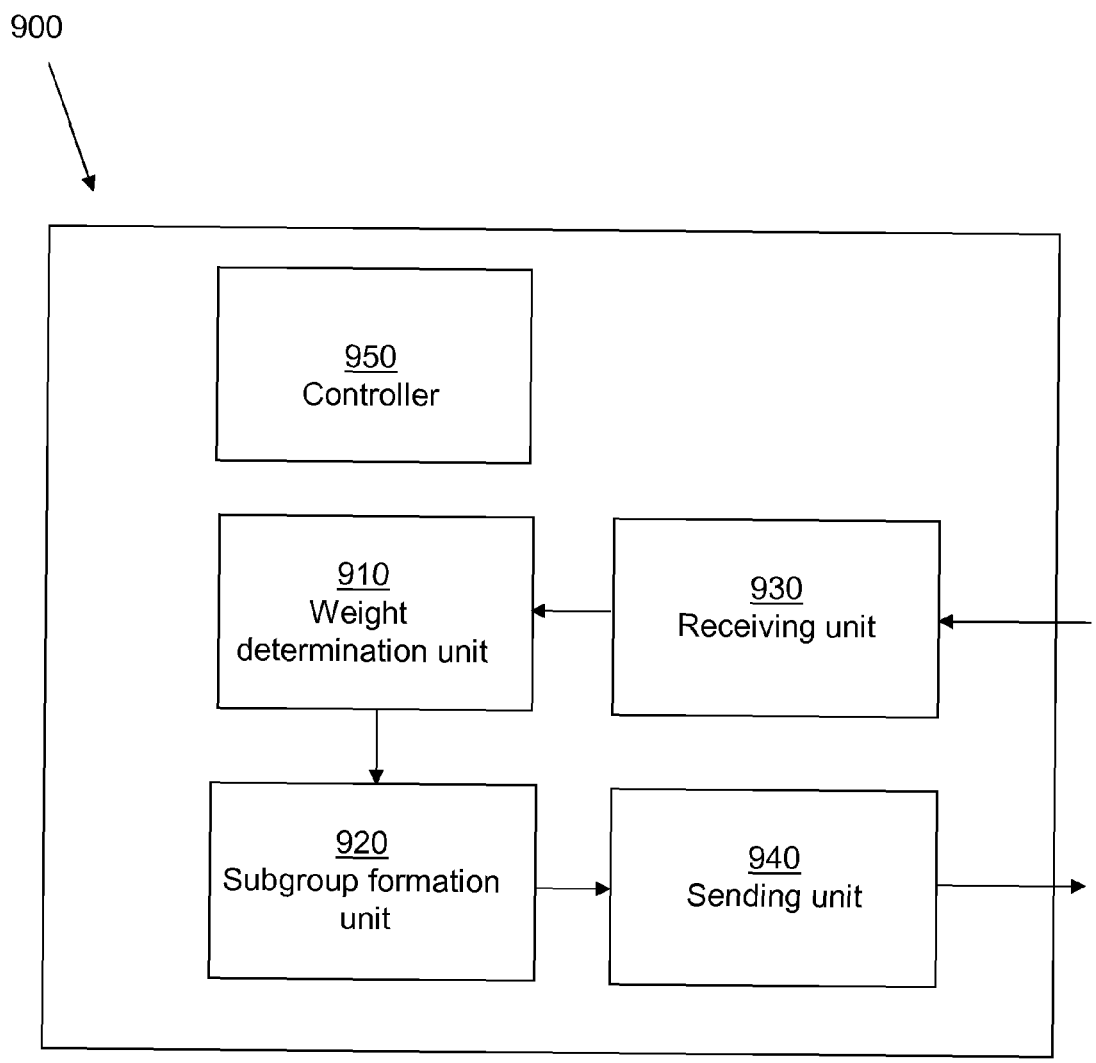
FIG. 9 is a schematic block diagram illustrating an arrangement in a network node according to an embodiment of the present invention.

An arrangement in a network node, e.g. an eNB, according to an embodiment of the invention will now be described with reference to FIG. 9. The arrangement 900 is comprised in an eNB 310, 610 within a wireless communications network 300, 600 comprising M cells. As will be further described below, the arrangement 900 is configured to form at least a first subgroup SC of cells, i.e. a coordination area. The subgroup SC comprises a maximum of K cells, where K<=M. As shown in FIG. 9, the arrangement 900 comprises a weight determination unit 910, a subgroup formation unit 920, a receiving unit 930, and a sending unit 940. Furthermore, the arrangement 900 comprises a controller 950, which is used for generic controlling purposes. The controller 950 will not be described in detail here, as it is not essential for the functioning of the present embodiment.

The weight determination unit 910 is configured to determine at least one weight $a_{ij}$ associated with a first cell $C_i$ and a second cell $C_j$ in the wireless communications network 310, 610. The weight $a_{ij}$ indicates a radio network characteristic which depends on said first cell $C_i$ and said second cell $C_j$.

In one variant of this embodiment, the radio network characteristic indicates the level of mutual interference between the cells $C_i$ and $C_j$. As mentioned above, cells with high mutual interference are good candidates for inclusion in the same subgroup.

The subgroup formation unit 920 receives input from the weight determination unit 910. Based on the weights received from the weight determination unit 910, the subgroup formation unit 920 is configured to form the at least first subgroup SC of cells, by selecting at most K cells from the M cells in the wireless communications network 310, 610. The selection is performed in such a way that the sum of the weights $a_{ij}$ for each cell $C_i$ and $C_j$ that are comprised in the subgroup SC is approximately maximized. As discussed above, there are various ways of performing this selection. For instance, the subgroup formation unit 920 may be configured to perform steps 430-460 as described in connection with FIG. 4 above. The variants described in connection with FIG. 4 are applicable to the subgroup formation unit 920 as well.

In a variant of this embodiment, the subgroup formation unit 920 is further configured to compute the number K, i.e. the maximum number of cells in a subgroup, based on one or more network-related constraints. For instance, K could be computed based on latency and/or capacity, and/or physical available backbone transport network connections, and/or the signal processing capability in the radio transmission/reception units in, e.g eNBs, as mentioned above.

The sending unit 940 receives input from the subgroup formation unit 920 regarding one or more newly formed subgroups. Based on this input, the sending unit 940 is configured to send a message to each cell $C_k$ in the subgroup SC comprising data relating said cell $C_k$ to said subgroup SC. As mentioned above, the message is sent over the transport network, to which the sending unit 940 is connectable.

In a variant of this embodiment, the arrangement 900 is configured to form the at least a first subgroup SC periodically. In a further variant, the at least first subgroup SC is formed according to a predetermined time schedule. As mentioned above, this variant has the additional advantage of taking predictable changes in traffic distribution into account.

An arrangement in an eNB according to a further embodiment of the invention will now be described, again referring to FIG. 9. In this embodiment, the arrangement 900 comprises the same units as in the embodiment described above. In addition, the arrangement 900 comprises a receiving unit, which is configured to receiving at least one message from at least one network node $N_i$. The other node $N_i$ manages at least one cell $C_i$ comprised in the M cells of the wireless communications network 300, 600. The message comprises data relating to the radio network characteristic dependent on $C_i$ and the at least one other cell $C_j$, also comprised in the M cells.

In a variant of this embodiment, the at least one message comprises data relating to the number of users in cell $C_i$ that are experiencing interference from the at least one other cell $C_j$. As discussed above, this information will need to be combined with a corresponding message from cell $C_j$, in order to determine the level of mutual interference between $C_i$ and $C_j$. It should be noted that the message sent from the network node $N_i$ may in turn be based on measurements reported by the UEs that are connected to the network node $N_i$, e.g. neighbor list measurements. This will be further described below.

In the present embodiment, the weight determination unit 910 is further configured to determine the at least one weight $a_{ij}$ associated with the first cell $C_i$ and the second cell $C_j$ based on the data comprised in the at least one message. In other words, the weights are determined based on statistics gathered from other nodes in the network.

The arrangement 900 and the units comprised therein may be implemented through one or more processors, together with computer program code for performing the functions of units 910, 920, 930, and 940. The program code mentioned above may also be provided as a computer program product, for instance in the form of a data carrier carrying computer program code for performing the function of units 910, 920, 930 and 940 when being loaded into the network node 310, 610. One such carrier may be in the form of a CD ROM disc. It is, however, feasible to use other data carriers such as a memory stick. The computer program code can furthermore be provided as pure program code on a server and downloaded to network node 310, 610 remotely.

Figure 10:
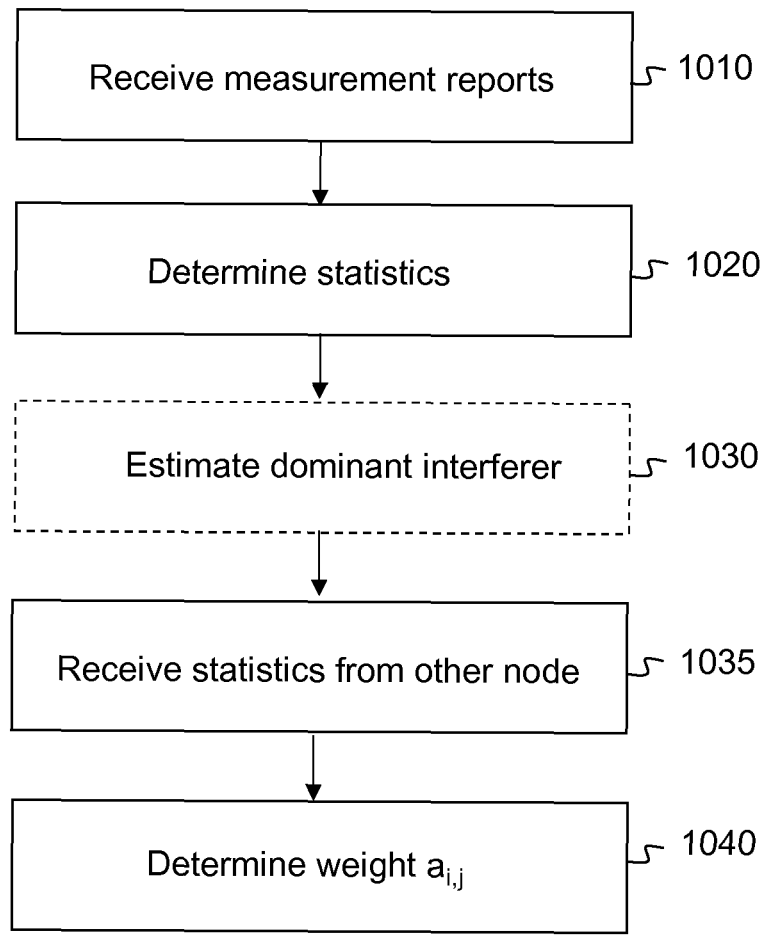
FIG. 10 is a flow chart illustrating a method in a network node according to an embodiment of the present invention.

A method in a network node for gathering statistics according to an embodiment of the present invention will now be described with reference to FIG. 6 and FIG. 10.

The present method is applicable to the semi-adaptive approach to forming subgroups, as described above. As previously discussed, in order to form appropriate subgroups in a wireless communications network 600, a set of weights between different pairs of cells in the network is first determined. In the semi-adaptive approach, the weights are determined based on the current traffic distribution, and reflect the level of mutual interference between pairs of cells. To determine these weights, the statistics gathered in the present embodiment may be used.

The method in the present embodiment is performed in a network node, e.g. eNB 610, which is comprised in a wireless communications network 600 comprising 6 cells. It should be noted, however, that the present method is applicable to wireless communications networks of any size. Therefore, the number of cells in the network will be denoted M in the following description. eNB 610 manages a cell 610 with four connected UEs, as indicated by the four crossed circles in FIG. 6 exemplifying the snapshot of the situation at a specific time instance. At another time instant, a snapshot of the situation will likely reveal a different set of active users at perhaps other locations. Again, the method applies generally to a network node serving at least one cell comprised in the M cells, which will in the following be denoted $C_i$. At least one mobile terminal, e.g. a UE, is located in the cell $C_i$ and is connected to the network node.

According to the present method, eNB 610 gathers measurements from its connected UEs during a specific time period. Each UE sends measurement reports to its connected eNB during network operation. The measurement reports include not only channel measurements, i.e. average path gain, of the link between the UE and its serving eNB, but also of the links among the UE and a number of neighbor eNBs. These types of measurements, referred to as neighbor list measurements, are typically performed in modern cellular networks and may be used for handover purposes. Based on these measurements, the eNB 610 determines statistics relating to the dominant interferers for each served UE.

In a first step 1010, eNB 610 receives at least one measurement report from the at least one mobile terminal which is connected to it. The at least one measurement report comprises data relating to the signal strength received from at least one neighboring cell $C_j$. All measurement report data is stored for further usage and are described in more detail below. The data in may be stored consecutively from an absolute time instance (e.g. Aug. 7, 1992, 12 am), from sub-periods (e.g. a month, a day, an hour, etc.) in cyclic periods or by random selection and/or by the most recent measurement via a sliding time window (e.g. a year, a month, a day, an hour, etc.) for all data or for sub-periods.

In a variant of this embodiment, the at least one measurement report is a neighbor list measurement.

The measurement reports per UE may be received periodically over time (e.g. with a frequency of approximately 2 Hz, i.e. 2 measurement reports per second, as in GSM), may be based on demand request or may be triggered by events as, e.g. the interference level is larger than a threshold and/or the total quality of the signal drops below a quality threshold.

In step 1020, eNB 610 determines statistics indicating the number of mobile terminals that experience interference from each neighboring cell $C_j$. The statistics are based on the at least one measurement report received in step 1010.

Statistics, e.g. distribution functions of the neighboring cells interference level impact to the active UEs per neighboring cell $C_j$. Another example of statistics determined is the distribution function of the $C/I_j$ per neighboring cell $C_j$. This can be performed since the measurement report includes the momentarily signal level of the serving and all neighbor cells. An alternative that can be used is the ordered or sorted neighbor statistics, i.e. the distribution functions for all neighbor cells $C_j$, frequency to be the strongest dominant interferer, the second strongest interferer and so on. These or similar type of statistics can be selected to be calculated from either all collected and stored measurement reports or subsets of the available measurement data. For example, to select different time windows (single snapshot or cyclic periods) addressing seasonal patterns (Christmas shopping, vacation period, etc.), weekly patterns (Monday, work days, weekend, etc) and/or daily patterns (morning, afternoon, night, etc.) can be calculated statistically.

In a variant of this embodiment, eNB 610 estimates the dominant interferer of each served UE in a step 1030. This is performed by sorting the measurements gathered from a specific time period. From these estimations, the eNB 610 acquires an overview on the number of interferers and on the percentage of the user population that each neighboring cell interferes.

In step 1035, eNB 610 receives statistics from at least one other network node, managing a neighboring cell $C_j$. This enables eNB 610 to calculate the weight or weights, i.e. the mutual dependency, between cells $C_i$ and $C_j$, by combining the measurements from these cells, as discussed above.

In step 1040, eNB 610 determines at least one weight $a_{ij}$ associated with the cell $C_i$ and the neighboring cell $C_j$, based on the statistics gathered in steps 1020 and 1035. The weight $a_{ij}$ indicates a radio network characteristic dependent on the cell $C_i$ and the neighboring cell $C_j$. In a further variant of this embodiment, the radio network characteristics is the level of mutual interference between the cell $C_i$ and the neighboring cell $C_j$.

Figure 11:
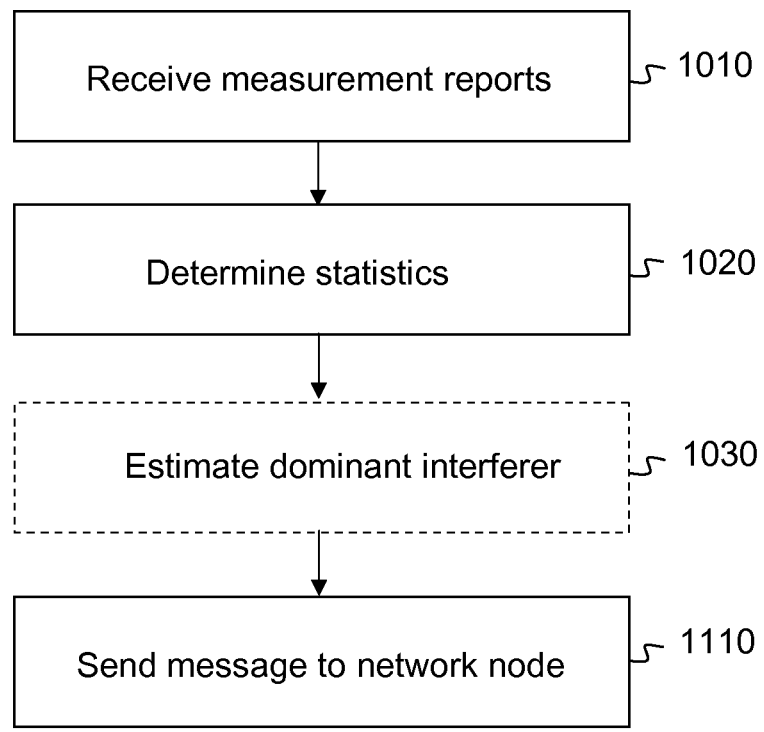
FIG. 11 is a flow chart illustrating a method in a network node according to an embodiment of the present invention.

A method for in a network node for gathering statistics according to a further embodiment of the present invention will now be described with reference to FIG. 11.

This embodiment is similar to the one described above in connection with FIG. 10. The main difference is that the eNB does not calculate the weights itself. Instead, the estimations are sent to a central controller. Since this controller needs to be connected to a number of eNBs, it can be placed in a central network node which controls a large set of eNBs. The central controller may be co-located and/or hosted by a eNB.

According to this embodiment, steps 1010-1030 are performed as described in connection with FIG. 10 above.

In step 1110, eNB 610 sends a message to a network node, i.e. a central controller. The message comprises data relating to the number of mobile terminals in the at least one cell $C_i$ that are experiencing interference from the at least one other cell $C_j$.

Based on the data from the message the network node, i.e. central controller, determines the weights. This process may be performed essentially as in steps 1035 and 1040, described in connection with FIG. 10 above.

Figure 12:
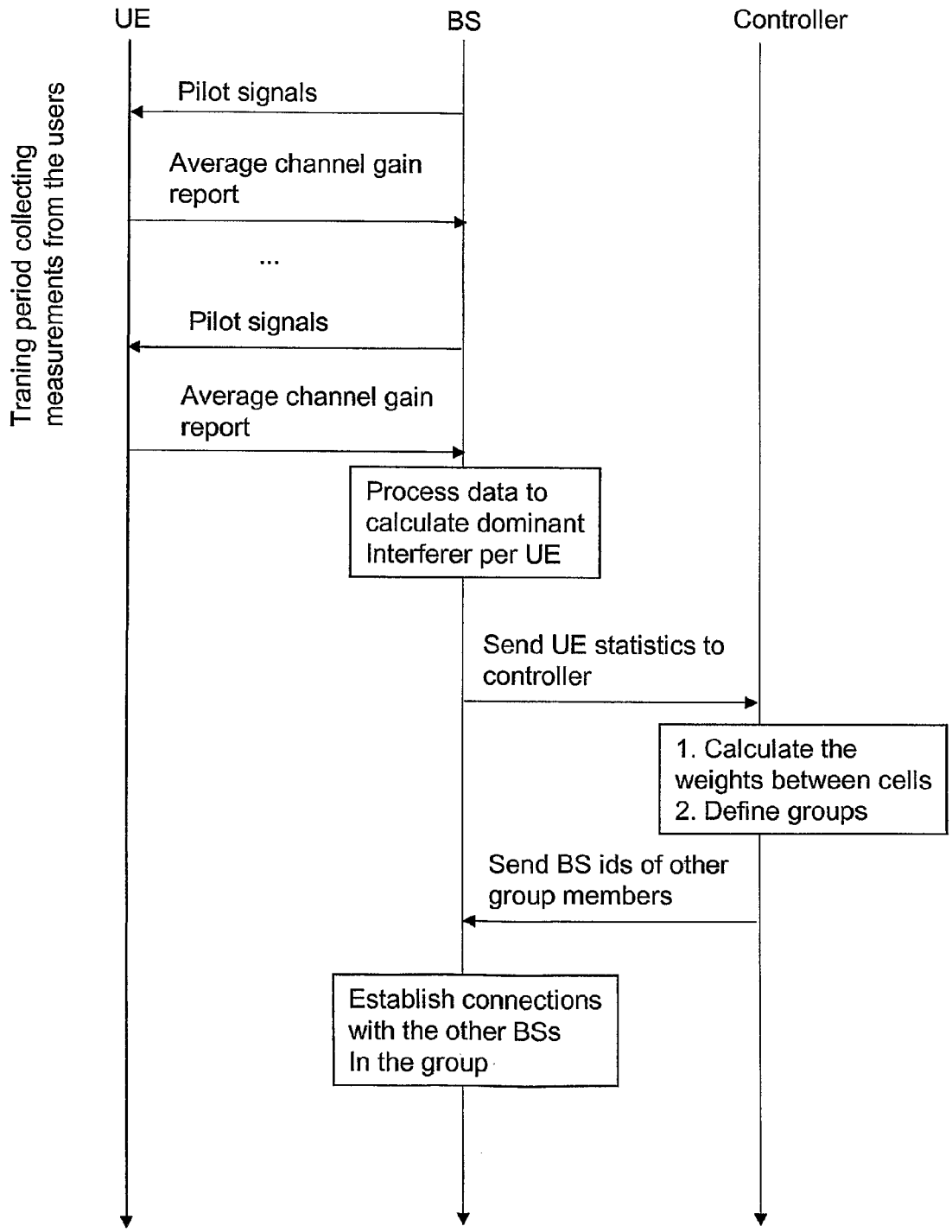
FIG. 12 is a combined signalling scheme and flow chart illustrating a method according to an embodiment of the present invention.

FIG. 12 illustrates an exemplary message flow between the different network nodes in this embodiment. Note that in the example of FIG. 12, the central controller is also responsible for forming the groups, and informing each eNB about the other members of its subgroup. However, it is also conceivable that the subgroups are formed in another node, based on the weights provided by the central controller.

In a variant of this embodiment, the central controller is an RNC, i.e. in a W-CDMA network. In another variant, the central controller is an O&M node in an LTE network.

It is pointed out that the methods described above for gathering statistics may also be implemented in a distributed system, provided that the eNBs can communicate with each other. In that case, an eNB can act in master mode gathering information from the rest of the eNBs in the network. Based on these measurements, the controller may calculate the weights of the network graph.

Figure 13:
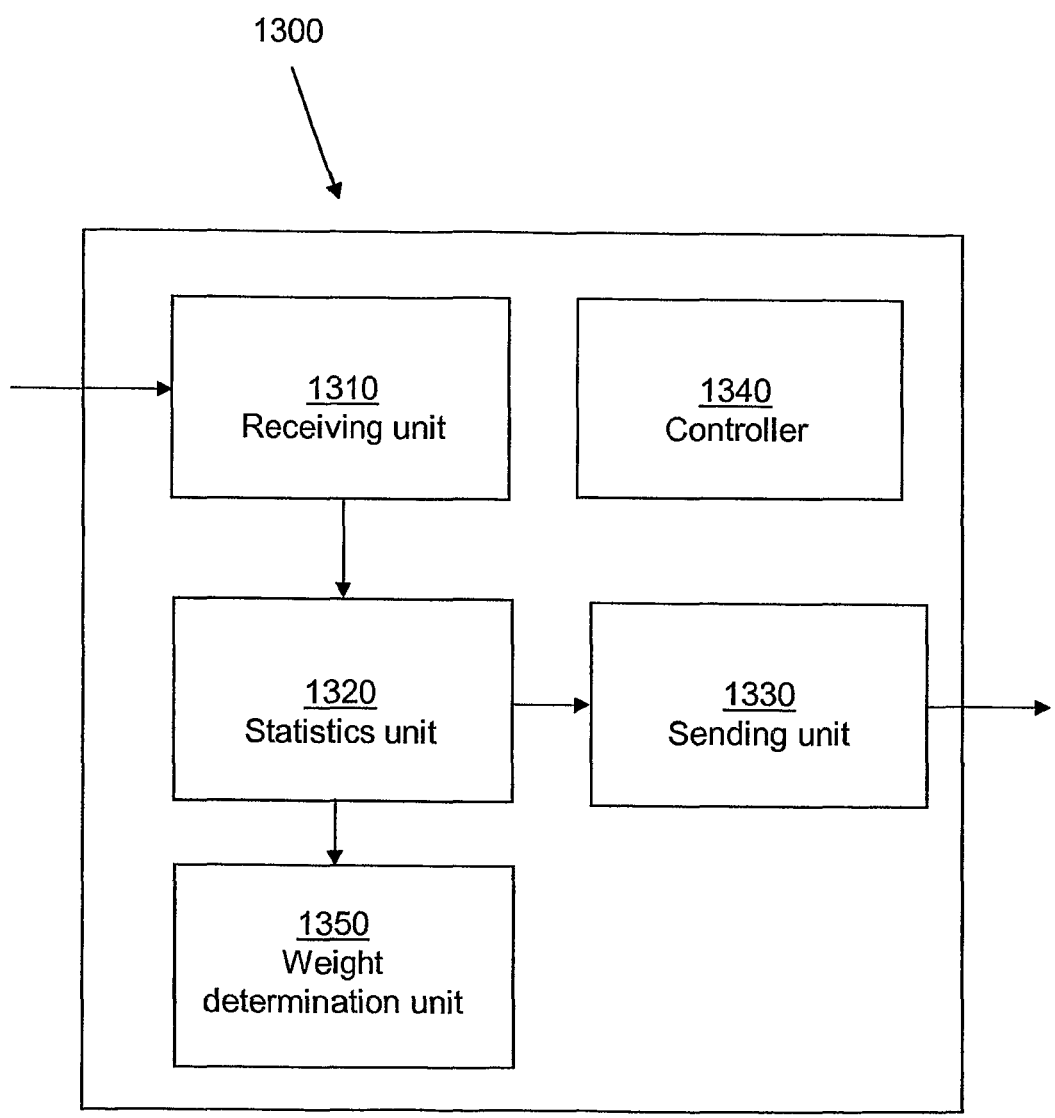
FIG. 13 is a schematic block diagram illustrating an arrangement in a network node according to an embodiment of the present invention.

An arrangement for a network node, e.g. an eNB, for gathering statistics according to an embodiment of the invention will now be described with reference to FIG. 13. The arrangement 1300 is comprised in an eNB within a wireless communications network 600 comprising M cells. The network node serves at least one cell $C_i$ comprised in the M cells, and the network node has at least one connected mobile terminal, e.g. an UE. The at least one mobile terminal is located within the at least one cell $C_i$.

According to the present embodiment, the arrangement 1300 comprises a receiving unit 1310, a statistics unit 1320, and a weight determination unit 1350. Furthermore, the arrangement 1300 comprises a controller 1340, which is used for generic controlling purposes. The controller 1340 will not be described in detail here, as it is not essential for the functioning of the present embodiment.

The receiving unit 1310 is configured to receive at least one measurement report from the at least one mobile terminal. The at least one measurement report comprises data relating to the signal strength received from at least one neighboring cell $C_j$.

The statistics unit 1320 is configured to determine statistics indicating the number of mobile terminals experiencing interference and/or the interference level experienced from each neighboring cell $C_j$, based on the at least one measurement report. In a variant of this embodiment, the statistics unit 1320 is further configured to estimate the dominant interfering cell for each of the at least one mobile terminals, based on the at least one measurement report. In this variant the statistics unit 1320 is configured to determine the number of mobile terminals experiencing interference from each neighboring cell $C_j$ based on the estimated dominant interfering cell for each of the at least one mobile terminals.

The weight determination unit 1350 is configured to use the statistics provided by the statistics unit 1320 to determine at least one weight $a_{ij}$ associated with the cell $C_i$ and the neighboring cell $C_j$. The weight $a_{ij}$ indicates a radio network characteristic dependent on the cell $C_i$ and the neighboring cell $C_j$, e.g. the level of mutual interference between the cells.

An arrangement in a network node according to a further embodiment of the invention will now be described, again referring to FIG. 13. In this embodiment, the arrangement 1300 comprises the same units as in the embodiment described above, apart from the weight determination unit, which is not present in this embodiment. Instead, the arrangement 1300 comprises a sending unit 1330.

The sending unit 1330 is configured to send a message to a network node, i.e. a central controller, comprising data relating to the number of mobile terminals in the at least one cell $C_i$ that are experiencing interference from the at least one other cell $C_j$, thereby enabling the network node to determine at least one weight $a_{ij}$ associated with the cell $C_i$ and the neighboring cell $C_j$. The weight $a_{ij}$ indicates a radio network characteristic dependent on the cell $C_i$ and the neighboring cell $C_j$, e.g. the level of mutual interference between the cells.

The arrangement 1300 and the units comprised therein may be implemented through one or more processors, together with computer program code for performing the functions of units 1310, 1320, 1330, 1340 and 1350. The program code mentioned above may also be provided as a computer program product, for instance in the form of a data carrier carrying computer program code for performing the function of units 1310, 1320, 1330, 1340 and 1350 when being loaded into the network node. One such carrier may be in the form of a CD ROM disc. It is, however, feasible to use other data carriers such as a memory stick. The computer program code can furthermore be provided as pure program code on a server and downloaded to the network node remotely.

In summary, the embodiments of the present invention as described above provide arrangements and systematic methods for defining groups of cells, also referred to as coordination areas, in real network deployments. The groups are defined based on the degree of coupling among cells, utilizing metrics available either by prediction or direct measurements of parameters in the actual deployments. Thus, given a fixed location of cell sites, groups of cells are formed which can be coordinated in order to improve network characteristics, e.g. increase the overall system throughput. These groups can correspond to cells that share ICIC information, to CoMP cells that share data and common channel information, etc.

It should be noted that although terminology from 3GPP LTE has been used in this disclosure to exemplify the invention, this should not be seen as limiting the scope of the invention to only the aforementioned system. Other wireless systems, including WCDMA, WiMax, UMB and GSM, may also benefit from exploiting the ideas covered within this disclosure.

The present invention is not limited to the above-describe preferred embodiments. Various alternatives, modifications and equivalents may be used. Therefore, the above embodiments should not be taken as limiting the scope of the invention, which is defined by the appending claims. In particular, although the exemplary embodiments refer to an LTE radio access network comprising eNBs, the disclosed methods for forming coordination areas may also be performed by another type of network node, e.g. a NodeB in a WCDMA network.

The invention claimed is:

1. A method performed by a network node including one or more processors, for improving radio network characteristics and performance in a wireless communications network comprising M cells the method comprising:

determining at least one weight $a_{ij}$ associated with a first cell $C_i$ and a second cell $C_j$ in the wireless communications network, wherein the weight $a_{ij}$ indicates a radio network characteristic dependent on said first cell $C_i$ and said second cell $C_j$;

forming at least first subgroup SC of cells by selecting at most K<M cells for coordinated transmission and/or reception between the cells in said subgroup SC, from the M cells in said wireless communications network, such that a function of the weights $a_{ij}$ for each cell $C_i$ and $C_j$ being in the subgroup SC is approximately maximized; and sending a message to each cell $C_k$ in the subgroup SC, the message comprising data related to said subgroup SC.

2. The method according to claim 1, wherein said function is the sum of the weights $a_{ij}$ for each cell $C_i$ and $C_j$ being in the subgroup SC.

3. The method according to claim 1, wherein the step of selecting at most K cells from the M cells in said wireless communications network comprises the steps of:

selecting a first cell $C_{first}$ from the M cells;
including the selected first cell $C_{first}$ in the subgroup SC;
selecting an additional cell $C_n$ from the M cells, such that there exists at least one weight $a_{n,sc} \neq 0$ associated with the cell $C_n$ and a cell $C_{sc}$ in the subgroup SC, and the sum of the weights $a_{n,l}$ associated with the cell $C_n$ and each cell $C_l$ being in the subgroup SC, l ranging from 0 to the number of cells in the subgroup SC, is maximized;
including the additional cell $C_n$ in the subgroup SC; and
repeating the steps of selecting an additional cell and including the additional cell until the subgroup SC comprises K cells, or there are no further cells $C_n$ such that there exists at least one weight $a_{n,sc} \neq 0$ associated with the cell $C_n$ and a cell $C_{sc}$ in the subgroup SC.

4. The method according to claim 3, wherein the first cell $C_{first}$ is selected from the M cells based on a cell-dependent metric.

5. The method according to claim 4, wherein the cell-dependent metric is selected from the group of: cell load, number of interfering cells, and interference signals strength level.

6. The method according to claim 3, wherein the step of selecting at most K cells from the M cells in said wireless communications network further comprises verifying that a physical communication link exists between each pair of cells $C_i$ and $C_j$ being in the subgroup SC.

7. The method according to claim 1, wherein the at most K cells are selected from the M cells in said wireless communications network such that there exists a weight $a_{i,j} \neq 0$ for each pair of cells $C_i$ and $C_j$ being in the subgroup SC.

8. The method according to claim 1, wherein the step of determining at least one weight $a_{ij}$ involves the steps of:

receiving at least one message from at least one network node $N_i$, wherein said other node $N_i$ manages at least one cell $C_i$ comprised in the M cells, said message comprising data relating to said radio network characteristic dependent on the at least one cell $C_i$ and at least one other cell $C_j$ comprised in the M cells; and
determining the at least one weight $a_{ij}$ associated with the first cell $C_i$ and the other cell $C_j$ based on the data comprised in the at least one message.

9. The method according to claim 8, wherein the at least one message comprises data relating to the number of users in the at least one cell $C_i$ that are experiencing interference from the at least one other cell $C_j$ comprised in the M cells.

10. The method according to claim 8, wherein the at least one message comprises data relating to the distribution function of the $C/I_i$ for each cell $C_i$ managed by said other node $N_l$.

11. The method according to claim 8, wherein the at least one message comprises data relating to sorted neighbor statistics for each cell $C_i$ managed by said other node $N_l$, said sorted neighbor statistics indicating for each cell $C_i$ its frequency as strongest interferer.

12. The method according to claim 1, wherein said radio network characteristic indicates the level of mutual interference between the cells $C_i$ and $C_j$.

13. The method according to claim 1, further comprising the step of computing the number K based on one or more network-related constraints selected from the group of: latency, capacity, transport network connectivity, availability of backbone links, signal processing capabilities of coordinating transmission/reception nodes.

14. The method according to claim 1, wherein the method is executed periodically.

15. The method according to claim 14, wherein the method is executed according to a predetermined time schedule.

16. A method performed by a network node including one or more processors, for gathering statistics in a wireless communications network comprising M cells, the network node managing at least one cell $C_i$ among the M cells, the network node serving at least one mobile terminal being located within the at least one cell $C_i$, the method comprising:
receiving at least one measurement report from the at least one mobile terminal, the at least one measurement report comprising data strength of a signal received from at least one neighboring cell $C_j$; and
determining at least one metric related to a radio network characteristic dependent on the cell $C_i$ and said at least one neighboring cell $C_j$, based on the at least one measurement report.

17. The method according to claim 16, wherein said metric comprises statistics indicating the number of mobile terminals experiencing interference from each neighboring cell $C_j$.

18. The method according to claim 16, wherein said metric comprises the distribution function of the $C/I_j$ for said at least one neighboring $C_j$.

19. The method according to claim 16, further comprising:
receiving statistics from at least one other network node, managing a neighboring cell $C_j$,
wherein said received statistics and determined metric are used for determining at least one weight $a_{ij}$ associated with the cell $C_i$ and the neighboring cell $C_j$, wherein the weight $a_{ij}$ indicates a radio network characteristic dependent on the cell $C_i$ and the neighboring cell $C_j$.

20. The method according to claim 17, further comprising:
estimating a dominant interfering cell for each of the at least one mobile terminal, based on the at least one measurement report,
wherein a number of mobile terminals experiencing interference from each neighboring cell $C_j$, is determined based on the estimated dominant interfering cell for each of the at least one mobile terminals.

21. The method according to claim 17, further comprising:
sending a message to another network node, the message comprising data related to the number of mobile terminals in the at least one cell $C_i$ that are experiencing interference from the at least one other cell $C_j$, thereby enabling the other network node to determine at least one weight $a_{ij}$ associated with the cell $C_i$ and the neighboring cell $C_j$, wherein the weight $a_{ij}$ indicates a radio network characteristic dependent on the cell $C_i$ and the neighboring cell $C_j$.

22. The method according to claim 21, wherein said message comprises sorted neighbor statistics for a number of neighboring cells $C_j$, indicating for each neighboring cell $C_j$ its frequency as the strongest interferer.

23. An arrangement for a network node for improving radio network characteristics in a wireless communications network comprising M cells, the arrangement comprising:
a weight determination unit configured to determine at least one weight $a_{ij}$ associated with a first cell $C_i$ and a second cell $C_j$ in the wireless communications network, wherein the weight $a_{ij}$ indicates a radio network characteristic dependent on said first cell $C_i$ and said second cell $C_j$;
a subgroup formation unit configured to form at least first subgroup SC of cells by selecting at most K<M cells for coordinated transmission and/or reception between the cells in said subgroup SC, from the M cells in said wireless communications network, such that a function of the weights $a_{ij}$ for each cell $C_i$ and $C_j$ being in the subgroup SC is approximately maximized; and
a sending unit, configured to send a message to each cell $C_k$ in the subgroup SC, the message comprising data related to said subgroup SC.

24. The arrangement according to claim 23, wherein said function is the sum of the weights $a_{ij}$ for each cell $C_i$ and $C_j$ being in the subgroup SC.

25. The arrangement according to claim 23, wherein the subgroup formation unit is further configured to select at most K cells from the M cells in said wireless communications network by:
selecting a first cell $C_{first}$ from the M cells;
including the selected first cell $C_{first}$ in the subgroup SC;
selecting an additional cell $C_n$ from the M cells, such that there exists at least one weight $a_{n,sc} \neq 0$ associated with the cell $C_n$ and a cell $C_{sc}$ in the subgroup SC, and the sum of the weights $a_{n,l}$ associated with the cell $C_n$ and each cell $C_l$ being in the subgroup SC, l ranging from 0 to the number of cells in the subgroup SC, is maximized;
including the additional cell $C_n$ in the subgroup SC; and
repeating the steps of selecting an additional cell and including the additional cell until the subgroup SC comprises K cells, or there are no further cells $C_n$ such that there exists at least one weight $a_{n,sc} \neq 0$ associated with the cell $C_n$ and a cell $C_{sc}$ in the subgroup SC.

26. The arrangement according to claim 25, wherein the subgroup formation unit is further configured to select the first cell $C_{first}$ from the M cells based on a cell-dependent metric.

27. The arrangement according to claim 26, wherein the subgroup formation unit is further configured to select the cell-dependent metric from the group of: cell load, and number of interfering cells.

28. The arrangement according to claim 25, wherein the subgroup formation unit is further configured to verify that a physical communication link exists between each pair of cells $C_i$ and $C_j$ being in the subgroup SC, when selecting the at most K cells from the M cells in said wireless communications network.

29. The arrangement according to claim 23, wherein the subgroup formation unit is further configured to select the at most K cells from the M cells in said wireless communications network such that there exists a weight $a_{i,j} \neq 0$ for each pair of cells $C_i$ and $C_j$ being in the subgroup SC.

30. The arrangement according to claim 23, further comprising
a receiving unit, configured to receiving at least one message from at least one network node $N_l$, wherein said other node $N_i$ manages at least one cell $C_i$ comprised in the M cells, said message comprising data relating to said radio network characteristic dependent on the at least one cell $C_i$ and the at least one other cell $C_j$ comprised in the M cells; and wherein the weight determination unit is further configured to:

determine the at least one weight $a_{ij}$ associated with the first cell $C_i$ and the second cell $C_j$ based on the data comprised in the at least one message.

31. The arrangement according to claim 30, wherein the at least one message comprises data relating to the number of users in the at least one cell $C_i$ that are experiencing interference from the at least one other cell $C_j$ comprised in the M cells.

32. The arrangement according to claim 23, wherein said radio network characteristic indicates the level of mutual interference between the cells $C_i$ and $C_j$.

33. The arrangement according to claim 23, wherein the subgroup formation unit is further configured to compute the number K based on one or more network-related constraints selected from the group of: latency, and capacity.

34. The arrangement according to claim 23, being configured to form the at least a first subgroup SC periodically.

35. The arrangement according to claim 34, being configured to form the at least a first subgroup SC according to a predetermined time schedule.

36. The arrangement according to claim 23 for use in a radio base station.

37. An arrangement for a network node for gathering statistics in a wireless communications network comprising M cells, the network node serving at least one cell $C_i$ among the M cells, the network node having at least one connected mobile terminal, the at least one mobile terminal being located within the at least one cell $C_i$, the arrangement comprising:

a receiving unit, arranged to receive at least one measurement report from the at least one mobile terminal, the at least one measurement report comprising data related to strength of a signal received from at least one neighboring cell $C_j$; and a statistics unit, configured to determine statistics relating to a radio network characteristics dependent on said at least one cell $C_i$ and said at least one neighboring cell $C_j$, based on the at least one measurement report.

38. The arrangement according to claim 37, wherein the statistics unit is further configured to determine statistics indicating the number of mobile terminals experiencing interference from each neighboring cell $C_j$.

39. The arrangement according to claim 37, wherein the statistics unit is further configured to determine a distribution function of the $C/I_j$ for said at least one neighboring cell $C_j$.

40. The arrangement according to claim 37, further comprising a weight determination unit configured to use said statistics to determine at least one weight $a_{ij}$ associated with the cell $C_i$ and the neighboring cell $C_j$, wherein the weight $a_{ij}$ indicates a radio network characteristic dependent on the cell $C_i$ and the neighboring cell $C_j$.

41. The arrangement according to claim 37, wherein the statistics unit is further configured to estimate a dominant interfering cell for each of the at least one mobile terminals, based on the at least one measurement report, and wherein the statistics unit is also configured to determine a number of mobile terminals experiencing interference from each neighboring cell $C_j$ based on the estimated dominant interfering cell for each of the at least one mobile terminals.

42. The arrangement according to claim 41, wherein the statistics unit is further configured to determine sorted neighbor statistics, which for each neighboring cell $C_j$ indicate its frequency as strongest interferer.

43. The arrangement according to claim 37, further comprising:

a sending unit configured to sending a message to another network node, the message comprising data related to a number of mobile terminals in the at least one cell $C_i$ that are experiencing interference from the at least one other cell $C_j$, thereby enabling the other network node to determine at least one weight $a_{ij}$ associated with the cell $C_i$ and the neighboring cell $C_j$, wherein the weight $a_{ij}$ indicates a radio network characteristic dependent on the cell $C_i$ and the neighboring cell $C_j$.

* * * * *

UNITED STATES PATENT AND TRADEMARK OFFICE
CERTIFICATE OF CORRECTION

PATENT NO. : 9,037,174 B2  
APPLICATION NO. : 13/392941  
DATED : May 19, 2015  
INVENTOR(S) : Koutsimanis et al.

Page 1 of 1

It is certified that error appears in the above-identified patent and that said Letters Patent is hereby corrected as shown below:

In the Drawings

In Fig. 12, Sheet 10 of 11, delete "Traning" and insert -- Training --, therefor.

In the Specification

In Column 9, Line 54, delete "max $a_{ij} \forall i \epsilon S_n\}$" and insert -- max $a_{ij} \forall i \epsilon S_n\}$. --, therefor.

In Column 11, Line 32, delete "has i" and insert -- has j or i --, therefor.

Signed and Sealed this
Twelfth Day of January, 2016

Michelle K. Lee  
*Director of the United States Patent and Trademark Office*